Nov. 17, 1942.  C. W. CROUSE  2,302,422
CALCULATING MACHINE
Filed Oct. 16, 1937  5 Sheets-Sheet 1

INVENTOR
Carl W. Crouse
BY
Davis Lindsey Smith Shunts
ATTORNEYS

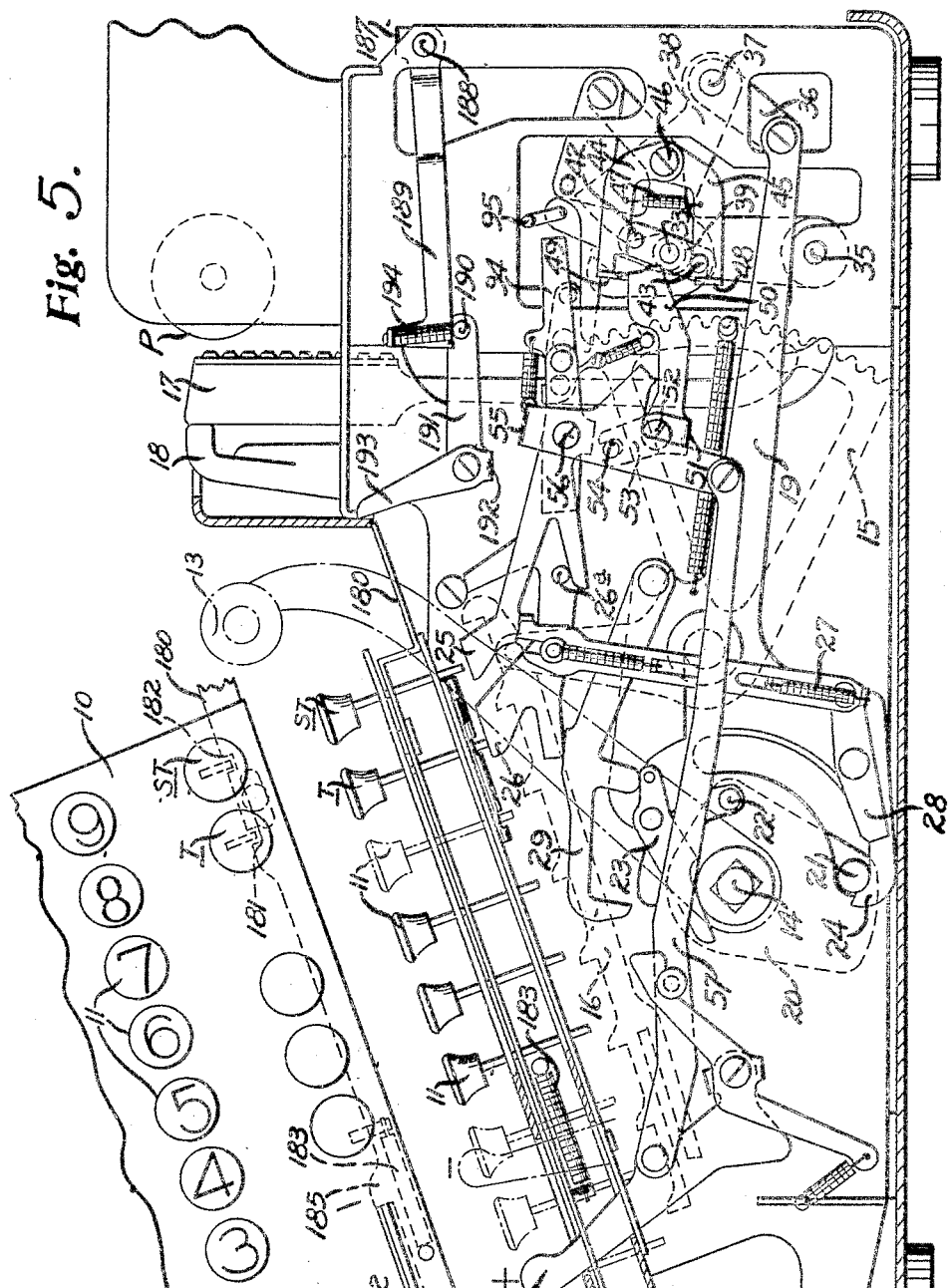

Nov. 17, 1942.        C. W. CROUSE                2,302,422
                   CALCULATING MACHINE
               Filed Oct. 16, 1937         5 Sheets-Sheet 3

INVENTOR
Carl W. Crouse
BY
ATTORNEYS

Nov. 17, 1942.　　C. W. CROUSE　　2,302,422
CALCULATING MACHINE
Filed Oct. 16, 1937　　5 Sheets-Sheet 4

INVENTOR
Carl W. Crouse
BY
ATTORNEYS

Nov. 17, 1942.  C. W. CROUSE  2,302,422
CALCULATING MACHINE
Filed Oct. 16, 1937  5 Sheets-Sheet 5

INVENTOR
Carl W. Crouse
BY
ATTORNEYS

Patented Nov. 17, 1942

2,302,422

UNITED STATES PATENT OFFICE 2,302,422

CALCULATING MACHINE

Carl W. Crouse, Chicago, Ill., assignor to Burroughs Adding Machine Company, Detroit, Mich., a corporation of Michigan Application October 16, 1937, Serial No. 169,374

6 Claims. (Cl. 235—60)

This invention relates to a calculating machine and it particularly concerns a construction for enabling a true algebraic total to be taken directly, no matter whether the total is positive or negative.

Totals are usually taken from a calculating machine register by rotating the register pinions in a direction reverse to that in which they were rotated in accumulating the total, and by arresting the pinions in their "0" positions under the control of the pawls of the tens-transfer mechanism which are locked for that purpose as an incident to conditioning the machine for the taking of the total. If only positive totals are accumulated in the register, these totals are drawn by rotating the register pinions to zero in the direction opposite to the direction of rotation for adding, and the totals thus obtained will be correct. When both positive totals and negative totals can be drawn from the register directly, positive totals are drawn in the above-mentioned way, and negative totals can be drawn by rotating the register pinions to zero in the direction opposite to the direction of rotation for subtraction, but, errors arise if the total in the register passes through zero and its algebraic sign changes an odd number of times during the accumulating of the total, these errors heretofore have affected the correctness of the totals drawn from the register in the above-mentioned manner or have been corrected by the insertion of compensating amounts into the register, usually automatically. With the more usual forms of construction of register and associated transfer mechanism, a total drawn after a change of sign of the amount in the register would be "1" too small in absolute value, if it were not that the total is corrected by increasing its absolute value by "1," usually by a mechanism which automatically inserts "1" in the register. This error is usually known as the "fugitive 1" error, and the usual mechanisms for correcting it are called "fugitive 1" mechanisms.

The general object of the present invention is to provide an improved calculating machine in which true algebraic totals can be taken from the register directly whether positive or negative.

A more particular object is to provide a calculating machine which will enable true positive and true negative totals to be taken directly from the register without the entry of a correcting amount into the register.

Other objects and advantages of the invention will appear from the following specification and drawings.

An embodiment of the invention is shown in the accompanying drawings in which:

Fig. 5 is a side elevation of a calculating machine containing the invention, the casing being removed.

Fig. 6 is a partial plan view of the keyboard showing the bank of control keys, the units order bank of amount keys, and a portion of the negative total lock.

Figure 9:
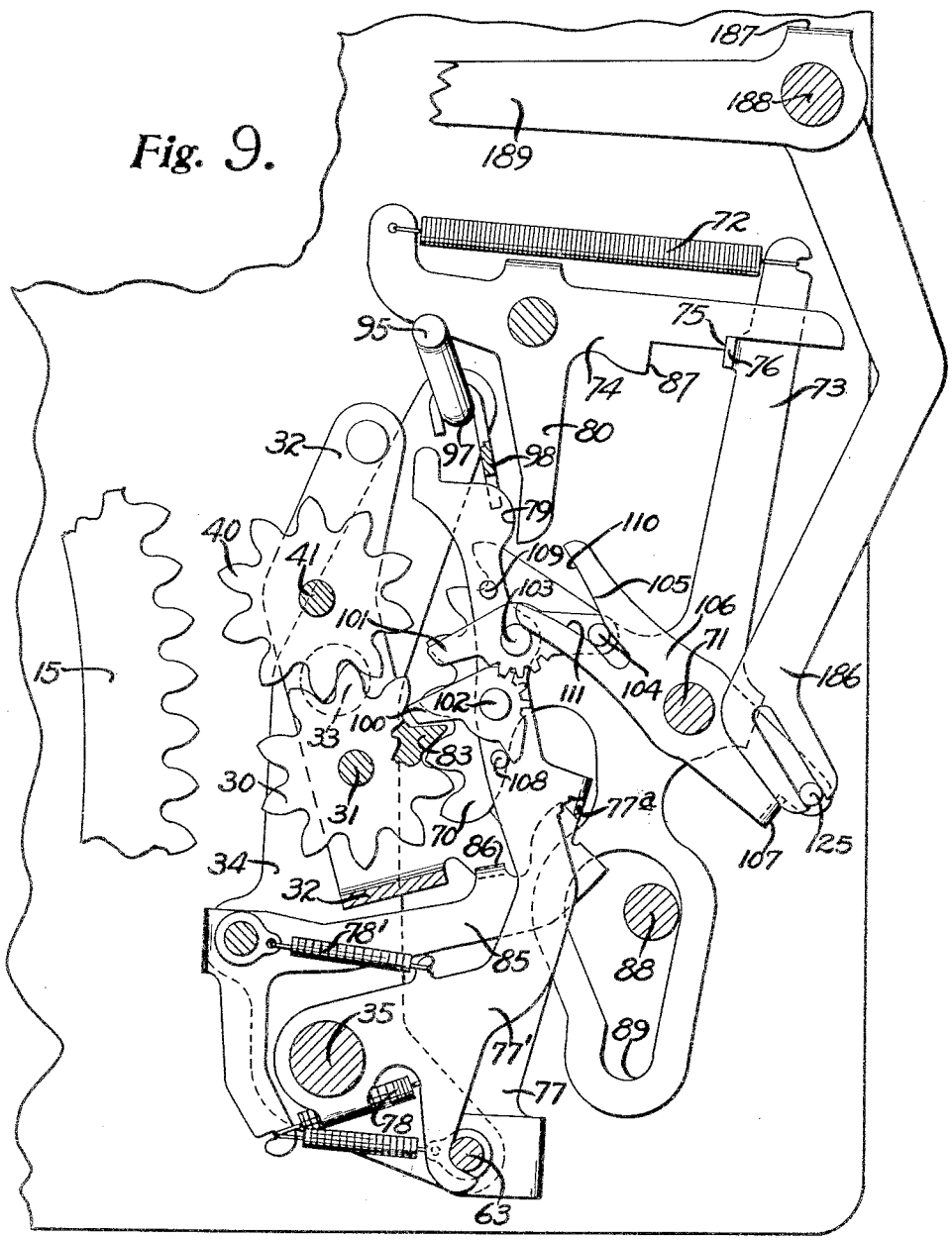

Fig. 9 is a vertical section, lengthwise of the machine through the registering and tens-transfer mechanisms in a plane immediately to the right of the units order register pinions, viewing the machine from the front, but with the units order transfer segment and its latch omitted, and showing the parts in the positions they occupy when the machine is at rest after a negative total taking operation, and after a subtracting operation with a negative total in the register.

Figure 10:
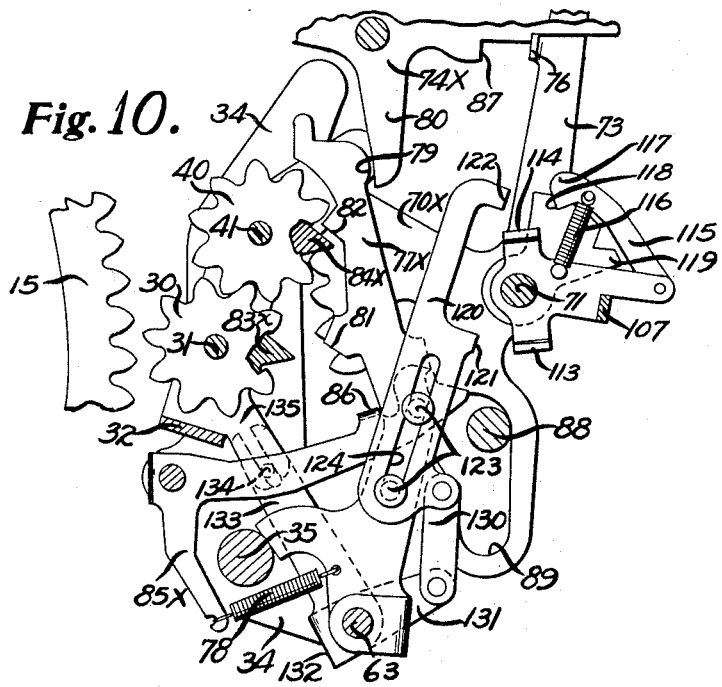

Fig. 10 is a vertical section in a plane parallel to the plane of Fig. 9 but located immediately to the right of the highest order pinions of the register and showing the parts in the positions they occupy after an adding operation and with a positive total in the register.

Figure 11:
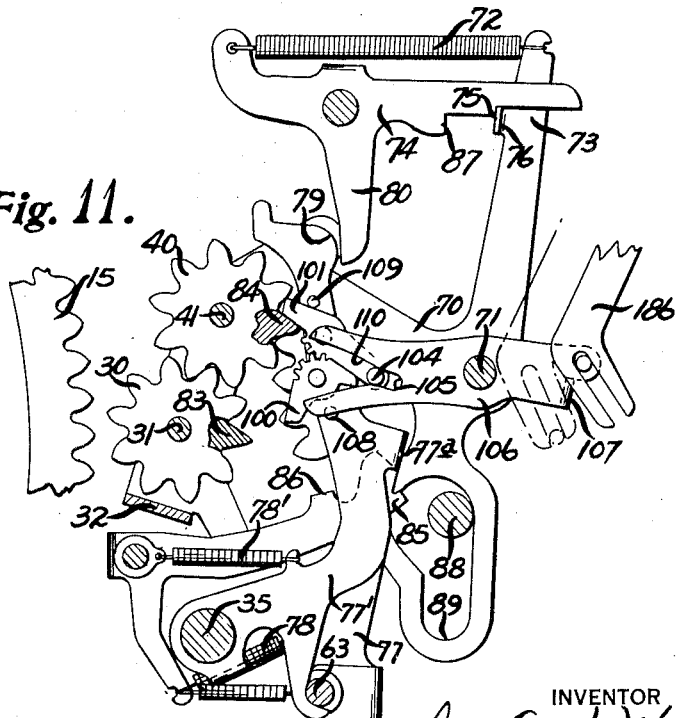

Fig. 11 is a sectional view similar to Fig. 9, but showing the parts in the positions they occupy when the machine is at rest after an adding operation and with a positive total in the register, and after a positive total taking operation.

In order that the invention may be more readily understood, a brief explanation will be given of the problem of obtaining true algebraic totals. The explanation will be made with reference to machines constructed for use with the decimal system of numbers, but it will be apparent that a similar explanation will apply to other machines, for example, those constructed for the "English currency" system.

REGISTERING AMOUNTS AND DRAWING TOTALS

Before considering algebraic totals, it will be well to consider the fundamentals of mechanical addition, subtraction and total taking. Basically, any two structural elements or sets of elements can be used for mechanical adding and total taking if one of said elements or sets of elements can serve as a stop or set of stops for the other element or set of elements, which latter, after being initially placed in positions determined by such stop or stops, can be moved relative to such stop or stops proportionately to the amounts to be registered and can then be returned to their initial positions determined by such stop or stops, the total being determined from the extent of return movement required to bring the movable element or elements back to the initial positions determined by said stops. If subtraction is to be performed, the form and arrangement of the elements must be such as to permit the movable element or elements to move in subtraction operations in the direction opposite from the direction of movement in adding operations, that is, in the same direction as in taking positive totals, but should not be arrested by the stop element or elements in such subtraction movement. For taking negative totals directly, the movable element or elements should be moved in the direction opposite to the subtracting direction, that is, in the adding direction.

In order that the range of movement may be kept within practical limits, a movable element and a stop element are provided for each numerical order in such amounts and totals as are to be dealt with, and the form and arrangement of the movable elements are such that when any one of them is moved a certain number of steps from its initial position, usually ten for operation with the decimal system of numbers, that movable element is brought back to its starting position and a tens-transfer means operates to advance the movable element of the next higher order one step in the proper direction. Fundamentally, that is all that is needed for mechanical addition, subtraction and the drawing of positive and negative totals.

In Figs. 1 to 4 of the drawings, the stop elements are shown at 3 and the movable elements at 2. The transfer mechanism is not shown but may take various forms usually including pawls having transfer cams or projections cooperating with the movable members 2 and may serve also as the stop elements 3, as will be assumed to be the case in Figs. 1 to 4. Figs. 1 to 4 show no means for moving the movable elements, here shown as being rotatable about a shaft. The means for rotating the rotatable movable elements 2 usually take the form of a pinion or a pair of intermeshing or geared-together pinions which are adapted to be driven by gears, segments, or racks controlled by suitable means. In any case, the pinions are not fundamentally essential registering elements, but are only a suitable mechanical means for enabling the movable elements 2 to be rotated with precision by the gears, sectors, racks or other means for causing the desired calculating operations to be performed on the movable elements 2 which are the essential movable registering elements. Though the rotation of the pinions will be mentioned in the following description and claims, it is to be understood, in every instance, that it is the rotation of the movable registering element 2, hereinafter referred to as the transfer tooth or projection on the pinion, which is material, and that amounts are entered into and totals are taken from a register by rotating such transfer teeth or projections 2 and by no other means or method, and that it is immaterial through what mechanical connections, whether including pinions or not, the transfer projections or teeth 2 are rotated.

THE PROBLEM OF NEGATIVE TOTALS

If an amount, such as 47, is subtracted from "0," the algebraic total is —47. This is the type of negative total that is desired when a negative total is taken from a calculating machine. However, caucul ating machines are mechanical structures having certain numerical capacities depending upon the number of banks in the machine. For example, a nine bank machine has a capacity of 999,999,999. If 47 were subtracted from a clear register on such a machine, it would be equivalent to subtracting 47 from 1,000,000,000. If a total were then taken in the usual manner the result would be, viewed on the add numerals on the register pinions, 999,999,953. This is the complement of the true negative total whereas the operator really wants the true algebraic total of —47. In order to get the latter in a calculating machine some special provision has to be made for taking true negative totals.

To be consistent with the rules of mathematics, if an amount is subtracted from a clear register, each register pinion, in the orders corresponding to the amount, should move in a subtraction direction from its "0" position to an extent corresponding to the value of the digit in the corresponding order of the amount. The pinions of orders higher than the amount should remain at "0," and not move. Subsequently, in order to take a total, the pinions should be returned to "0" so that all those that are free to move will move back an amount corresponding to the distance they were moved away from "0" in a negative direction. This would give an algebraic, or true and correct negative, total.

But the construction of calculating machines is not such as to enable them to operate entirely consistently with the rules of mathematics in taking both negative and positive totals from the same mechanism, so that, to obtain true and correct negative as well as positive totals, it is necessary to deal with mathematical errors resulting from the mechanical construction of the machine, which will now be explained. In explaining these errors, reference will be made to a simple register having only a single set of pinions such as shown in Figs. 1 to 4, inclusive. The problem is the same in machines having registers provided with two sets of pinions that intermesh, as in the so-called "tumbling registers," or having registers in which coaxial addition and subtraction pinions are geared together by bevel gears.

"POSITIVE 0" AND "NEGATIVE 0" POSITIONS OF THE REGISTER PINIONS

The "0" positions of the register pinions are the positions in which the pinions are left by total-taking operations and from which the pinions start in accumulating subsequent totals.

Figure 1:
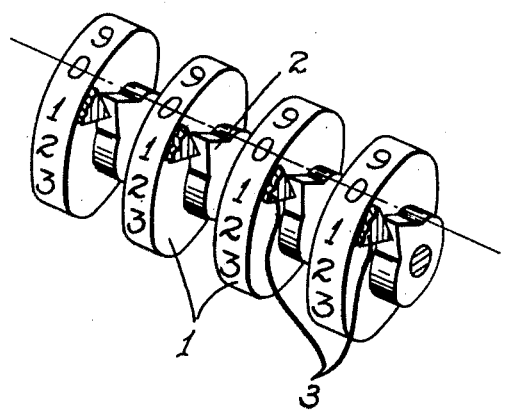
Figure 1 is a schematic perspective view of the registering wheels and associated tens-transfer pawls of a four-place register with the registering wheels in their "positive 0" positions after a positive total has been taken.

In adding operations, the pinions I of the register of Fig. 1 are rotated clockwise to extents corresponding to the amounts added. In subtracting operations the pinions I are rotated counterclockwise to extents corresponding to the amounts subtracted. In taking positive totals, the pinions 1 are rotated counterclockwise until stopped in the positions of Fig. 1 by engagement of their transfer projections 2 against the noses 3 of transfer pawls which are locked in total-taking operations. In taking negative totals directly, the pinions 1 are rotated clockwise until arrested in the positions of Fig. 3 by engagement of their transfer projections 2 against the noses 3 of the transfer pawls. The Fig. 1 positions of the pinions 1 are, therefore, the "positive 0" positions from which they will start in accumulating the next total after a positive total-taking operation and the Fig. 3 positions are the "negative 0" positions from which they will start in accumulating the next total after a direct negative total-taking operation.

During total taking, type carriers in the several numerical orders are moved to extents corresponding to the extents to which the register pinions for the corresponding numerical orders are rotated and the total printed from the type, therefore, corresponds to the extents to which the register pinions are rotated in total taking. If the register pinions, in total taking, are rotated to extents corresponding to the total of the amounts which have been entered into the register, as is the case in the example just considered, the correct total will be printed.

If, in a subtracting operation, the pinions start from the "positive 0" position of Fig. 1, it will be evident that the first step of movement of each transfer projection will not be away from its pawl, but will be a movement from one side of the pawl to the other from the "positive 0" positions to the "negative 0" positions. It will be clear that if, in accumulating a negative total, the pinions started from the "positive 0" position of Fig. 1, they cannot be rotated in direct negative total taking to the extent that they were moved in accumulating the total because, when the tens-transfer pawls are locked upon conditioning the machine for total taking, and the pinions rotate in the direct negative total direction (clockwise in Figs. 3 and 4), their transfer projections are arrested by the left sides of the transfer pawls as shown in Fig. 3.

Figure 2:
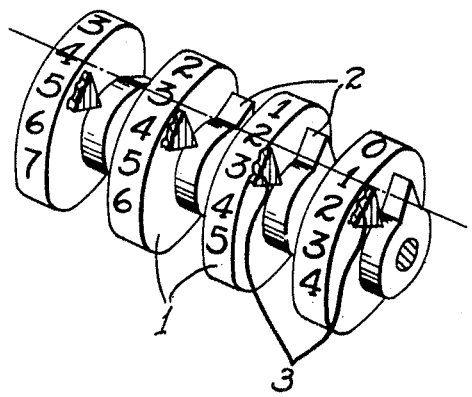
Fig. 2 is a view similar to Fig. 1 with some of the register pinions moved away from the "positive 0" position of Fig. 1 as the result of an adding operation.
Figure 3:
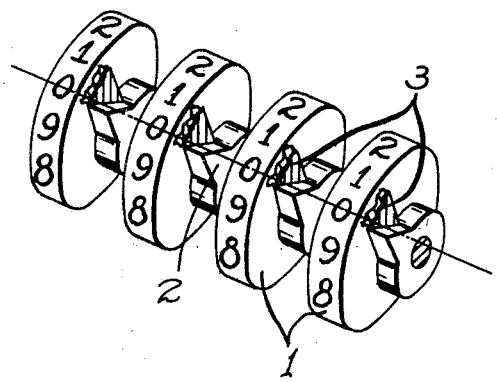
Fig. 3 is a perspective view similar to Fig. 1 with the register pinions in their "negative 0" positions at the finish of negative total taking operations.
Figure 4:
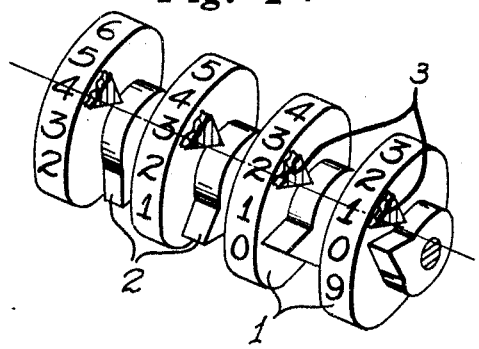
Fig. 4 is a view similar to Fig. 3 with some of the pinions moved away from the "negative 0" positions of Fig. 3, as the result of a subtracting operation.

Likewise, if the pinions 1 start from their "negative 0" positions of Fig. 3 and "4321" is subtracted, i. e., the amount "—4321" is entered, the pinions will be rotated counterclockwise to the positions shown in Fig. 4. In Figs. 3 and 4, the negative total indicating numerals are arranged on the pinions with reference to the "negative 0" position and a negative total datum line shown in dot-dash. The negative total datum line is displaced one step from the positive total datum line of Figs. 1 and 2. The negative total numerals in Figs. 3 and 4 are "9" complements of the positive total numerals occupying the corresponding positions on the pinions of Figs. 1 and 2. Thus, the "negative 0" positions of the pinions correspond to the "positive 9" positions. If a direct negative total-taking operation is now performed, the pinions 1 will be rotated clockwise to extents corresponding to the correct value of the true negative total and stopped in their "negative 0" positions of Fig. 3.

If the register pinions could always be started from their "positive 0" positions in accumulating positive totals and always started from their "negative 0" positions in accumulating negative totals, correct positive and negative totals would always be obtained, but in the practical every day use of calculating machines, the operator seldom knows when starting to enter a series of positive and negative items in the machine what the algebraic sign of the total will be.

Likewise, if the pinions 1 start from their "negative 0" positions of Fig. 3 in accumulating a positive total, they cannot be rotated in the positive total-taking direction during the total-taking operation to the extent they were rotated in the adding direction. The first step of rotation of any pinion in adding an item on the pinions when they are in their "negative 0" positions of Fig. 3 will move their transfer projections 2 from one side of their transfer projections as in Fig. 3 to the other side of their transfer projections as in Fig. 1, and, in positive total-taking operations, the pinions will be stopped in the "positive 0" positions of Fig. 1.

In either of the latter two cases, that is, when the register pinions are started either from their "positive 0" positions in accumulating a negative total or from their "negative 0" positions in accumulating a positive total, the absolute value of the positive or negative total, as the case may be, drawn from the register, is always smaller by "1" than the absolute value of the correct algebraic total or the positive and negative amounts which have been entered into the register. This unit has been lost in the machine and has become known as the "fugitive 1."

While most calculating machines are so constructed that the register pinions have "negative 0" positions which are not the same as the "positive 0" positions but correspond to the "positive 9" positions of the pinions as described above, some known machines are constructed so that the register pinions have but a single set of "0" positions in which the pinions are stopped in both positive and direct negative total taking, and from which the pinions always start in accumulating new totals of either sign. This results in eliminating errors in positive totals but, in the accumulation of any negative total, there is always an error, which differs in value from the above-mentioned "fugitive 1" error and will be explained further below, which would show up in the negative total drawn from the machine if rather complicated means were not provided for correcting the error.

It has been mentioned above that, whenever the pinions 1 of the register of Figs. 1 to 4 start from their "positive 0" positions of Fig. 1 in a subtracting operation or from their "negative 0" positions of Fig. 3 in an adding operation, the first step of rotation of any pinion 1 moves the transfer projection 2 of said pinion from one side directly to the other side of the nose 3 of the transfer pawl. This gives rise to an operation of the transfer mechanism which does not correspond to any mathematical rule for addition or subtraction, but is, instead, a source of error.

In fact, the entry into a register of any number which results in the total standing in the register immediately after such entry being of the algebraic sign opposite to the algebraic sign of the last previous total standing in the register, the tens-transfer mechanism may operate in some orders of the register contrary to the rules of mathematics applicable to the calculation involved and it may fail to operate in other orders of the register as would be required by such rules.

When "6311" is subtracted from the register of Fig. 2 the pinions of which started from their "positive 0" positions of Fig. 1 in an adding operation in which "+4321" was entered, the thousands, hundreds, tens and units order pinions are rotated respectively six, three, one and one steps counterclockwise. The hundreds and units order pinions are thus brought back to their "positive 0" positions, while the tens order pinion is moved to its "1" position, and the thousands order pinion is moved from its "2" to its "8" position which carries its transfer projection 2 past the transfer pawl 3, setting the transfer pawl to cause a tens-transfer to the tens-of-thousands order pinion (not shown) and leaving the transfer projection 2 on the thousands order pinion one step removed from the left face of its transfer pawl 3. The transfer to the tens-of-thousands order pinion gives rise to transfers from order to order across the rest of the register, as well known, and leaves the tens-of-thousands and higher order pinions at their positive "9" positions where their transfer projections are adjacent the left-hand faces of their transfer pawls. The pinions in the seven lowest orders would be in their positive "9998010" positions. The mathematically correct total is "−1990." But the actual positions of the pinions in relation to the "positive 0" positions of Fig. 1 from which the pinions started indicates a total of "−1112090." It can thus be seen that an error has occurred, but it is important to consider the cause and the amount of the error, and thus the effect it will have on the total to be obtained.

TRANSFERS ERROR

Subtraction of a larger number from a smaller number can be considered as the algebraic combination of a larger negative number with a smaller positive number, the resultant of which can be determined arithmetically by subtracting the smaller from the larger and giving to the remainder the sign of the larger, i. e., a negative sign. Thus, 4321−6311=(6311−4321)=1990. The "borrows" which are effected in the larger of the two numbers in performing this operation have the effect of causing the numerals in certain orders of the remainder which is obtained to be one unit smaller than would be the case if the "borrows" were not effected. The subtractive transfers which occur in the register when subtracting the larger number from the register which previously contained the smaller number as a positive amount, have the effect of moving certain register pinions one step further than they would be moved if such subtractive transfers were not effected and thus cause these register pinions, in the positions in which they come to rest, to indicate, with respect to their starting "positive 0" positions, numerals which are one unit larger than they would indicate if the subtractive transfers were not effected.

In the lowest numerical order in which the register pinion comes to rest in any position other than its starting "positive 0" position after such subtraction, and in any lower order, the positions of the pinions in relation to their starting "positive 0" positions indicate the same numerals as are to be found in the corresponding orders of the correct total, because in the algebraic operation no "borrow" could occur which would affect the numeral in any such order in the remainder and in the register no subtractive transfer could occur which would affect the position of the pinion in any such order.

Referring to the smaller number as the minuend and the larger number as the subtrahend, it can be said that in the lowest numerical order in which a pinion comes to rest in any position other than its starting "positive 0" position, and in every order to the left, one or another of the following conditions obtains: (1) numeral in the minuend is greater than the numeral in the subtrahend, or (2) the numeral in the minuend is equal to the numeral in the subtrahend and in the nearest order to the right in which the numerals in the minuend and subtrahend are not equal, the numeral in the latter order of the minuend is greater than the numeral in the latter order in the subtrahend, or (3) the numeral in the minuend is smaller than the numeral in the subtrahend, or (4) the numeral in the minuend is equal to said numeral in the subtrahend and in the nearest order to the right in which the numerals in the minuend and subtrahend are not equal, the numeral in the latter order of the minuend is smaller than the numeral in the latter order in the subtrahend. In any orders to the right of the lowest order in which the register pinion comes to rest in any position other than its starting "positive 0" position, the numerals in the minuend and subtrahend must be identical. In the operation of the calculating machine, which results in the sign of the total in the register changing from positive to negative, the smaller number, which we have termed the minuend, is first in the register and the larger subtrahend is then subtracted, whereas in the algebraic process, the smaller number is always subtracted from the larger number and the algebraic sign of the larger number is given to the remainder. From the foregoing, it follows that for each numerical order in which either of the first two above-stated conditions (1 or 2) obtains, the algebraic process requires a borrowing operation which would make the numeral in the next higher order of the remainder "1" less in absolute value than it would be if the "borrow" were not effected. In such orders no subtractive transfers occur in the register because the positive numeral standing on the register pinion is of larger absolute value than the numeral to be subtracted. For each numerical order in which either of the other two above-stated conditions (3 and 4) obtains, a subtractive transfer will occur in the register and will move the pinion in the next order to the left to a position which is one step farther in the subtractive direction from its starting "positive 0" position than the position in which it would be left if no transfer was effected, but no "borrowing" operation is required in the algebraic process. Therefore, in all numerical orders to the left of the lowest order in which a register pinion comes to rest in any position other than its starting "positive 0" position after such a subtraction, the position in which the pinion comes to rest is one step in the subtractive direction beyond the position where, in relation to its starting "positive 0" position, it would indicate the numeral in the corresponding order in the correct total. This, as will now be shown, does not mean that the amount of the error which has occurred is a number which can be represented by "1" in each of these orders.

The pinions may come to rest at their starting "positive 0" position in some orders higher than the lowest order in which a pinion comes to rest at any position other than its "positive 0" starting position. From what has been shown above, it follows that, in every such case, the numeral in the corresponding order of the correct total would be "9." Instead of the register pinion for that numerical order being required to rotate nine steps in the negative total-taking direction before coming back to its starting "positive 0" position, no rotation of the pinion is required to get it to its starting "positive 0" position. In this order, therefore, the pinion is nine steps short of the position where it would indicate the numeral in the corresponding order of the correct negative total. Now, if we reduce the numeral in this order of the correct negative total by "10" and simultaneously increase the numeral in the next order to the left in the correct negative total by "1," we will not change the value of the negative total, but the result will be that the pinion in the lower one of the two orders will indicate a numeral one unit larger than the numeral in the corresponding order of the correct negative total while the numeral in the higher of the two orders of the negative total will now be correctly indicated by the register pinion of the corresponding order.

From the foregoing, it follows that upon the entry into a register of a negative number which causes the algebraic sign of the total in said register to become negative after the pinions of said register have started from their "positive 0" positions in accumulating said total, an error occurs which has the absolute value of the number represented by "1" in each numerical order which is immediately to the left of any order of the register in which a pinion does not come to rest at its starting "positive 0" position and by "0" in any other orders. As the error increases the absolute value of the total, the error is of the same algebraic sign as the total.

*Example*

From (minuend)     426374852
subtract (subtrahend) 526674452

In accordance with the rules of mathematics, this problem is to be executed as follows:

$$+(-)526674452$$
$$-(+)426374852$$
$$+(-)100299600$$

In a calculating machine register, however, the operation could be performed as follows:

Assume that the pinions start from
  their "positive 0" positions_____ 000000000
Then the pinions would be moved
  to positions _____ 426374852
Next, the pinions would be moved
  to positions _____ 899700400
The indicated negative total is_____ −211300600

For ready reference, the numerical orders involved in the example will be considered as numbered from right to left. In the first and second lowest orders, the register pinions are in their starting "positive 0" positions because the numerals in these orders of the subtrahend are the same as the numerals in the same orders of the minuend, and ciphers are present in these two orders of the correct negative total. In the third order, the first of the above-defined conditions (1) obtains, i. e., the register pinion is in a position other than its starting "positive 0" position and the numeral in this order of the minuend is greater than the numeral in this order of the subtrahend. In the fourth and fifth orders, the second above-defined condition (2) obtains, and the numerals in these orders of the minuend are equal to the numerals in these orders of the subtrahend and, in the nearest order to the right (third order) in which the numerals in the minuend and subtrahend are unequal, the numeral in the latter order of the minuend is greater than the numeral in the latter order of the subtrahend. In the sixth and ninth orders, the third of the above-defined conditions (3) obtains, and the numerals in each of these orders of the minuend is smaller than the numeral in the corresponding order of the subtrahend. In the seventh and eighth orders of the above example, the fourth previously defined condition (4) obtains, i. e., the numerals in these orders of the minuend are equal to the numerals in the corresponding orders of the subtrahend and in the nearest order to the right (sixth order) in which the numerals in the minuend and subtrahend are unequal, the numeral in the latter order of the minuend is smaller than the numeral in the latter order of the subtrahend. In performing the example in accordance with the rules of mathematics, tens-transfers should be effected which would cause the pinions in orders 4, 5 and 6 each to be one step in the negative total-taking direction nearer to their starting "positive 0" positions than they will be if no such tens-transfers are effected. However, no such tens-transfers are effected in orders 4, 5 and 6 of the register in which the example is performed, and the register pinions in these orders are each one step in the subtraction direction beyond the positions which correspond to the numerals in the corresponding orders of the correct negative total. In the register in which the example is performed, subtractive transfers are effected which advance the register pinions in orders 7, 8 and 9 to positions one step farther from their starting "positive 0" positions than the positions in which they would be left if no such subtractive "tens-transfers" were effected. However, according to the rules of mathematics, no such subtractive "tens-transfers" should have been effected, and the register pinions in these orders are in positions one step farther in the subtractive direction than the positions which correspond to the numerals in the corresponding orders of the correct negative total. It will be noted that the pinion in the third lowest order is the lowest order pinion which has been left in a position other than its starting "positive 0" position, but that the pinions in orders 5 and 6 have been left in their starting "positive 0" positions. From all of the foregoing, it follows that the error which has been introduced into the register by misoperation of the transfer mechanism is "0" in orders 1, 2 and 3, is "+9" in orders 4 and 5, and is "−1" in orders 6, 7, 8 and 9, or, to state the net error as a single number, it is the difference between $$-111100000$$
$$\text{and } +000099000$$

which is −111001000

It will be seen that the error introduced into the register in the foregoing example has the same algebraic sign as the total and has the absolute value of the number represented by "1" in each numerical order which is immediately to the left in each numerical order (4th, 7th, 8th and 9th orders) which is immediately to the left of any numerical order (3d, 6th, 7th and 8th) of the register in which the pinion is not in its starting "positive 0" position at the completion of the operation, and by "0" in each other numerical order.

from "0" to "1" or from "1" to "0" in any of the several orders in the register as register pinions are moved into and out of their starting "positive 0" positions during further adding and subtracting operations which are performed after the sign of the total in the register has become negative but which do not change the sign of the total back to positive again. If, during such a further adding operation, any register pinion is moved into its "positive 0" starting position, the last step of such movement will occur as the numeral in the corresponding order of the indicated negative total changes from "1" to "0" but it will also cause an additive tens-transfer of the pinion of next higher order and thus change the error in such next higher order from "1" to "0." If, during such an adding operation, any pinion is moved out of its starting "positive 0" position, such movement will not cause any additive tens-transfer but the first step of such movement will occur as the numeral in the corresponding order of the indicated negative total changes from "0" to "9" so that the error in the next higher order will be changed from "0" to "1." If any pinion is moved into its starting "positive 0" position in a further subtraction operation, such movement will not cause any subtractive tens-transfer to the pinion of next higher order but the last step of such movement will occur as the numeral in the corresponding order of the indicated negative total changes from "9" to "0" so that the error in the next higher order will be changed from "1" to "0." If any pinion is moved out of its starting "positive 0" position during such a further subtraction operation, the first step of such movement will occur as the numeral in the corresponding order of the indicated total changes from "0" to "1" and will also cause a subtractive tens-transfer to the pinion of next higher order and thus change the error in such next higher order from "0" to "1." No other movements of the pinions will change the error. Thus the transfers error will remain of the same algebraic sign as the total in the register and "1" in every order immediately to the left of any order where the register pinion does not stand in its starting "positive 0" position and "0" in all other orders after further amount entering operations which do not produce a further change in the sign of the total.

*Example*

| | |
|---|---|
| Starting the pinions from ("Positive 0" positions) and first adding _____ (a) | 000000000 |
| | 426374852 |
| And then subtracting _____ (b) | 526674452 |
| The register pinions stand at __ (c) | 899700400 |
| And indicate a negative total of _ (d) | —211300600 |
| Whereas the correct negative total is _____ (e) | —100299600 |
| And the error in the register is ___ (f) | —111001000 |
| Then subtract _____ (g) | 93900120 |
| Thus moving the pinions to ____ (h) | 805800280 |
| Where they indicate a negative total of _____ (i) | 205200820 |
| Whereas the correct negative total is _____ (j) | —194199720 |
| And the error in the register is _ (k) | —011001100 |
| Then add _____ (l) | 107009800 |
| Thus moving the pinions to ___ (m) | 912810080 |
| Where they indicate a negative total of _____ (n) | —198290020 |
| Whereas the correct negative total is _____ (o) | — 87189920 |
| And the error in the register is _ (p) | —111100100 |

This example from line (a) to and including line (f) is a repetition of the last preceding example. Upon performing the subtraction in line (g), the register pinion in the second lowest order is moved from its starting "positive 0" position (line c) to its "8" position (line h) and an error of "—1" is introduced (line k) into the third lowest order where no error previously existed (line f). In the register, a subtractive tens-transfer from the second order to the third order was effected whereas, according to mathematical rules, no such tens-transfer should have been effected in the example $$+(-) \ 100299600$$
$$+(-) \ \ 93900120$$
$$=+(-) \ 194199720$$

Also, in the sixth order, the pinion is moved through its starting "0" position from its "7" position (line c) to its "8" position (line h) but no error previously existed (line f) in the seventh order and no error is introduced (line k) therein because, although a tens-transfer from the sixth to the seventh order was effected in the register, such tens-transfer was mathematically required. In the eighth order, the pinion is moved to its starting "positive 0" position (line h) from its "9" position (line c) and the error of "—1" which previously existed (line f) in the ninth order is cancelled (line k) because no tens-transfer from the eighth to the ninth order is effected in the register though it is mathematically required. The pinions do not move to or through or from their starting "0" positions in any other orders and so the errors in other orders are not affected. The thus altered error in the register is still "1" in every order which is immediately to the left of each order wherein a register pinion does not currently stand at its starting "positive 0" position and "0" in all other orders, and the error is still of the negative algebraic sign as is also the new total.

When, in continuing with the example, the addition of line (l) is performed on the register, the pinion in the third lowest order is moved from its "2" position (line h) to its "0" position line (m), thus causing an additive tens-transfer to the fourth order whereby the error of "—1" which previously existed in the fourth order (line k) is now cancelled (line p). In the fourth order, the pinion is rotated a total of ten steps, that is, a full revolution, and is again in its starting "0" position. This has caused an additive tens-transfer to the fifth order of the register but this tens-transfer is also required by mathematical rules and the error remains unchanged in the fifth order (lines k and p). The tens-transfer to the fifth order has, however, moved the fifth order pinion from its "0" position (line h) to its "1" position (line m) and it will be seen that there is now an error of "—1" in the sixth order (line p) where none previously existed (line k). The error of "—1" arises in the sixth order because in the example $$+(-) \ 194199720 \ (\text{line } j)$$
$$-(+) \ 107009800 \ (\text{line } l)$$
$$+(-) \ 87189920 \ (\text{line } o)$$

an additive tens-transfer from the fifth to the sixth order is required but is not effected in the register. In the eighth order, the pinion has also been moved from its starting "0" position (line h) to its "1" position (line m) and an error of "—1"

is thereby introduced into the ninth order for the same reason as the error in the sixth order has arisen. In the seventh order, the pinion has passed from its "5" position (line $h$) through its starting "0" position to its "2" position (line $m$) causing a tens-transfer to the eighth order where, however, the previously existing error is not altered (lines $k$ and $p$) because the tens-transfer was also required mathematically.

At the conclusion of the example, the error, which has changed in each operation of the register, is still of the same sign as the final total and is still "1" in every order which is immediately to the left of any order where the pinion, in its final position, stands out of its starting "positive 0" starting position, and "0" in all other orders.

From the foregoing it can be seen that at any time after the entry into a register of a negative number which causes the algebraic sign of the total in the register to become negative after the pinions of said register have started from their "positive 0" positions in accumulating said total, the error present in the total indicated by the pinions with reference to their starting "positive 0" positions is a number which is of the same sign as the total and is represented by "1" in each numerical order of the register which is immediately to the left of any order in which the register pinion does not currently stand in its starting "positive 0" position and by "0" in each other numerical order. The error which, if not corrected, would show in a negative total drawn from the register by rotating the pinions in the direction opposite to the subtracting direction to their starting "positive 0" positions would be determined in accordance with the above formula from the positions occupied by the pinions immediately before the negative total-taking operation.

By similar steps it can be shown that if the pinions of the register start from their "negative 0" positions of Fig. 3 in accumulating a total which acquires the positive algebraic sign, the positive total indicated by the positions of the pinions just before the positive total-taking operation in relation to their starting "negative 0" positions will contain an error which is also of the same algebraic sign as the total and of the absolute value represented by "1" in every order immediately to the left of any order in which the pinion does not stand in its "negative 0" starting position and by "0" in each other order.

As the error just determined is caused by the fact that the transfer mechanism of the register does not operate in a manner corresponding to the "carry" and "borrow" operations required in the mathematical processes of addition and subtraction, it will be termed the "transfers error." It will be noted that the value of the "transfers error" in the lowest or units order of the register is always "0" but may be either "1" or "0" in the higher orders of the register.

In machines in which, in taking positive totals and negative totals by returning the register pinions in opposite directions to the same "0" positions in every case, it is this "transfers error" which has to be corrected in order to obtain a correct negative total. Because of the nature of the error as shown above, any mechanism for correcting the "transfers" error is necessarily complicated.

No transfers error will exist at any time when the sign of the total in the register has changed an even number of times since the last total-taking operation, that is, when the total of amounts entered into the register since the last total-taking operation is of the same algebraic sign as the last total drawn from the register. Suppose that during the entry of successive amounts of a given mixed series of positive and negative amounts into a register, the algebraic sign of the running totals standing in the register after each successive amount of the series has been entered into the register has become the opposite of the algebraic sign of the total last drawn from the register and again become the same as the algebraic sign of said last drawn total, and suppose, further, that the largest number of numerical orders in any amount of said series as well as in any of said running totals standing in the register after the entry of any of said amounts has not exceeded $n$ numerical orders. In that case, the final total could be arrived at mathematically without any change in sign in the running totals if, by inserting at the head of the series the amount $10^{n+1}$ with the algebraic sign which is the same as that of the final total (the same also as the algebraic sign of the total last previously drawn from the register) and by including at the end of said series the amount $10^{n+a}$ with the opposite algebraic sign, where $a$ is any positive whole number.

$$\pm(10^{n+a}+x-10^{n+a}) = \pm x$$

where $x$ is the algebraic total of any series of positive and negative amounts. If the register has $n+a$ or more numerical orders, the problem could be performed in the same way in the register without any change of algebraic sign in the register and, therefore, without any transfers errors, because all tens-transfers would be effected in full agreement with mathematical rules. As the entry of $+10^{n+a}$ and $-10^{n+a}$ would in no wise effect the final total to be produced in the register even if the register had $n+a$ numerical orders and neither one nor both of such entries would neither effect nor affect any tens-transfers in the $n$th and lower orders of the register, it follows that all tens-transfers effected in the register during the accumulation of the total of any mixed series of positive and negative amounts will be mathematically correct if the total of the whole of said series of amounts is of the same algebraic sign as the last total previously drawn from the register, that is, notwithstanding an even number of changes of algebraic sign in the running total in the register with respect to the sign of the last previously drawn total.

*Example*

Problem A is performed in a register having 7 numerical orders and problem B is performed in a register having 6 numerical orders, the pinions of both registers being started in their "positive 0" positions in which they were left by a previous positive total-taking operation.

A

|  | Operation | New positions of pinions | Running totals |
| --- | --- | --- | --- |
| (0) Add | $10^6 = 1,000,000$ | 1,000,000 | +1,000,000 |
| (1) Add | 4,525 | 1,004,525 | +1,004,525 |
| (2) Subtract | 52,437 | 0,952,088 | +0,952,088 |
| (3) Add | 63,351 | 1,015,439 | +1,015,439 |
| (4) Subtract | $10^6 = 1,000,000$ | 15,439 | +15,439 |

The correct final total +15,439 would be obregister.

B

|  | Operation | New positions of pinions | Running totals |
|---|---|---|---|
| (1) Add | 4,525 | 004,525 | +4,525 |
| (2) Subtract | 52,437 | 952,088 | −47,912 |
| (3) Add | 63,351 | 015,439 | +15,439 |

Again, the correct final total would be obtained by a positive total-taking operation performed on the register. The ten-transfers effected in the register in operations 1, 2 and 3 in problem A are obviously mathematically correct. The tens-transfers effected in the register in the identical operations 1, 2 and 3 in problem B are the same as performed in operations 1, 2 and 3 in problem A and so must also be mathematically correct having regard to the algebraic sign of the final total.

TOTAL-TAKING ERROR

In most calculating machines capable of direct negative total taking, the register pinions, though they have started from their "positive 0" positions in accumulating a negative total, are not or cannot be returned in direct negative total taking to the "positive 0" positions from which they started. Instead, as in the register of Figs. 1 to 4, the transfer pawls 3, which are locked against movement in total taking, arrest the pinions in negative total taking at their "negative 0" positions (identical with their "positive 9" positions), as illustrated in Fig. 3, so that the negative total drawn from the register differs from the negative total indicated by the positions of the register pinions before total taking in relation to their starting "positive 0" positions.

In every numerical order in which the pinion does not stand in its starting "positive 0" position immediately before total-taking, the arrest of the pinion at its "positive 9" position in direct negative total taking restricts its rotation to one step less than the number of steps corresponding to the numeral in the corresponding order of the total indicated by the position of the pinion before total taking with respect to its starting "positive 0" position. But the error will not always be of the value of the number represented by "1" in every numerical order of the register.

Some of the register pinions may stand in their starting "positive 0" positions immediately before direct negative total taking. In each corresponding order of the total indicated by the positions of the pinions immediately before total taking in relation to their starting "positive 0" positions, the numeral would be "0," whereas the pinion in the same numerical order in the register is permitted to rotate nine steps to its "positive 9" position in direct negative total taking. Thus the number of steps of rotation in the negative total-taking direction permitted to the pinion in any numerical order where the pinion stands at its starting "positive 0" position immediately before total taking is nine steps more than the number of steps corresponding to the numeral in the corresponding order of the total indicated by the positions of the pinions immediately before total taking in relation to their starting "positive 0" positions. But we can increase by "10" the numeral in such an order of the negative total indicated by the positions of the register pinions in relation to their starting "positive 0" positions while simultaneously reducing the numeral in the next higher order of the indicated total by "1" without changing the value of the indicated total, and then the numeral in the order of the indicated negative total corresponding to the register pinion which stands in its starting "positive 0" position immediately before direct negative total taking is "1" greater than the number of steps of rotation permitted to that pinion in direct negative total taking and the numeral in the next higher order of the indicated negative total is equal to the number of steps of rotation permitted to the pinion in the said next higher order in direct negative total taking.

This is true also when the pinion in the said next higher order also stands in its starting "positive 0" position immediately before direct negative total taking. In the latter case it will also be necessary to increase by "10" the numeral in said next higher order of the indicated total while simultaneously reducing by "1" the numeral in the second next higher order of said total (thereby not changing the value of said indicated total) so that the numeral in the said next higher order can be considered to be "9" which corresponds to the number of steps which the pinion in the said next higher order is permitted to rotate in direct negative total taking, and so that the numeral in the said second next higher order of the indicated negative total can be considered to become equal to the number of steps of rotation permitted to the register pinion in said second next higher order in direct negative total taking. From the foregoing, the procedure for determining the total taking error in case pinions stand at their starting "positive 0" positions in three or more successive higher orders mediately or immediately to the left of the lowest order in which a pinion does not stand in its starting "positive 0" position before direct negative total taking is easily apparent. Thus, the error which occurs when the register pinions, which start from their "positive 0" positions in accumulating a negative total, are stopped at their "positive 9" positions in direct negative total taking is determined to be of the algebraic sign opposite to the sign of the total and of the absolute value of a number which is represented by "1" in every numerical order of the register except each order which is immediately to the left of any order in which the register pinion stands at its "positive 0" starting position immediately before total taking, i. e., the error is "1" in each order of the register which is immediately to the left of every order in which the pinion does not stand at its starting "positive 0" position immediately before total taking, and "1" in the units order.

*Example*

At the end of the last preceding example,

| | |
|---|---|
| The correct negative total was | −87189920 |
| And the transfers error in the register was | −111100100 |
| And the indicated negative total was | −198290020 |
| The total drawn directly by rotating the pinions to their "positive 9" ("negative 0") positions is | −87189919 |
| Showing a total-taking error of | +111100101 | as between the indicated total and the total drawn.

In the above example, the pinions in the lowest, the third and the fourth orders stand in their starting "positive 0" positions immediately before the direct negative total-taking operation and the pinions in those orders are permitted nine steps of rotation in the direct negative total-taking operation through the numeral in each of the corresponding orders of the total indicated by such positions of those pinions is "0." In each of the other orders the pinion is permitted, in direct negative total taking, to rotate a number of steps, which is "1" less than the numeral in the corresponding order of the indicated total. The negative total-taking error is, therefore,

```
 +111110010
 -000009909
 -----------
 =+111100101
```

By exactly similar steps, it can be shown that in taking a positive total from a register in which the total is accumulated after starting the pinions from "negative 0" positions corresponding to their "positive 9" positions, the total obtained will, as compared with the total indicated by the positions of the pinions immediately before total taking in relation to their "negative 0" starting positions, contain an error which is of the same algebraic sign as the total and of a value represented by "1" in each order immediately to the left of every order in which the pinion does not stand in its "negative 0" starting position immediately before total taking, and "1" in the units order.

As this last error occurs in the total-taking operation, it will be termed the "total-taking error."

NET ERROR—"FUGITIVE 1"

The net error in a total obtained from a register after the pinions start from their "positive 0" positions and accumulate a negative total which is drawn by rotating the pinions in the direction opposite to the positive total-taking direction and arresting them in their "positive 9" positions, and in a total obtained from a register after the pinions start from their "negative 0" ("positive 9") positions and accumulate a negative total which is drawn by rotating the pinions in the usual positive total-taking direction and arresting them in their "positive 0" positions, is the difference between the "transfers error" and the "total-taking error" and will always be of the value of "1" in the units order and of the algebraic sign opposite to the sign of the total.

When the amount in the register changes sign an even number of times during the accumulation of a total, there is, as previously shown, no transfers error, and no total-taking error can occur because the pinions are returned in total taking to the positions from which they started. There can be an error in the total taken from the register only after an odd number of changes of sign in the register.

NEGATIVE TOTAL BY CONVERSION OF COMPLEMENT

The errors above discussed do not occur when negative totals are taken by an indirect method including the following steps:

A positive total-taking operation is performed on the register containing the negative total. The amount thus obtained from the register is subtracted from a register, either the same or a second one, the pinions of which stand at "0" before the subtraction.

A positive total-taking operation is performed on the last-mentioned register which then yields the correct negative total.

Assuming that we are dealing with a register constructed for operation on the decimal system of numbers. If every total-taking operation which is performed with such a register is always effected by rotating the register pinions in the positive total-taking direction to their "positive 0" positions, no errors can arise in actual positive totals taken from such a register because, after any total-taking operation, the register pinions will always start from their "positive 0" positions in accumulating the next total and will always be returned to the same "positive 0" starting positions when that next total is drawn from the register. It is necessary, however, to consider what happens in the register when a negative total is encountered.

Assuming that after the pinions of such a register have started from their "positive 0" positions, the value of the amounts subtracted from the register exceeds the value of the amounts added in the register and a negative total, therefore, will stand in the register. The number of steps which each of the pinions can be rotated in a positive total-taking direction to its "0" position, together with the number of steps which the same pinion can be rotated in the direct negative total-taking direction to its "9" position, would total 9. It has already been shown that the total which would be drawn from the register in a direct negative total-taking operation in which the pinions are rotated to their "positive 9" positions would be one unit smaller in absolute value than the true negative total. The total thus drawn from the register could be represented as $-(T-1)$. Also, the number which is written as a series of 9's equal in number to the number of numerical orders in the register is equal to $10^n-1$, where $n$ is the number of orders in the register. Now, if the register pinions are, however, rotated in the positive total-taking direction to their "positive 0" positions, the amount thus drawn from the register will be the number having in each of its orders the numeral which is the complement, with respect to "9," of the number of steps which the same pinion could have been rotated in the direct negative total-taking direction to its "positive 9" position. Therefore, the amount drawn from the register in such a positive total-taking operation can be represented as $(10^n-1)-(T-1)=10^n-T$. In the negative total complement converting process under consideration, this amount $10^n-T$ would then be subtracted from a register all of the pinions of which previously stood in their "positive 0" positions, so that another negative total then stands in the register. Then another positive total-taking operation is performed on the register and all of its pinions are returned in the positive total-taking direction to their "positive 0" positions. In the same manner in which it was determined that the amount drawn by the positive total-taking operation which followed the occurrence of the original negative total would be $10^n-T$, it can be shown that the amount which is drawn by the positive total-taking operation which follows the subtraction of $10^n-T$ from a register previously having all of its pinions in their "positive 0" positions is $10^n-(10^n-T)=T$, which is, as previously indicated, the actual amount of the correct negative total.

As no final net errors are encountered in negative totals obtained by the indirect method discussed above, the present invention is not concerned with machines in which negative totals are obtained by such indirect method.

The invention is applicable to machines in which negative totals are taken by the direct method of rotating the pinions of the register in the direction opposite to their direction of rotation in positive total taking, and in which the above-discussed errors must be dealt with.

It is known to enable true algebraic totals to be taken directly by introducing into the machine, entries which compensate the errors. The insertion of the correcting amount has sometimes been effected just before total taking by entering it on the keyboard and operating the machine, or by depressing a special key, as in Rinsche 1,179,564, or by an automatic means. It has sometimes been entered by controlling the printing mechanism during the negative total-taking operation as in Draughon 1,195,567 or entered automatically into the register as by the usual "fugitive 1" mechanism, at the time the sign of the total in the register changes and under the control of the highest order pinion of the register, or automatically each time the register is changed from adding condition to subtraction condition and vice versa, as in Rinsche 1,172,484, and in other ways.

Before describing the novel provisions of the present invention for enabling correct negative totals as well as correct positive totals to be drawn directly from the register, it will be well to consider the general construction of the machine to which, for purposes of illustration, the invention will be applied as hereinafter described in detail.

The invention is shown as applied to a Burroughs portable machine which, as disclosed in the co-pending application of Thomas M. Butler, Serial No. 585,940, filed January 11, 1932, now Patent No. 2,118,588, is provided with an adding and subtracting register of the "tumbling" type and is adapted to produce and print negative as well as positive totals and sub-totals. Only so much of the machine as appears necessary to an understanding of the present invention will be described herein, reference being made to Patent No. 1,853,050 and to the above-mentioned application of Thomas M. Butler for details.

It is to be understood, of course, that the invention can be incorporated in machines of other types.

GENERAL CALCULATING MACHINE FEATURES

The machine is provided with a keyboard 10 having a plurality of banks of depressible amount keys 11 and a bank of control keys including a total key T and a sub-total key ST. The machine also has a subtract lever 12 for conditioning the machine for addition or subtraction. This lever normally occupies the full-line position shown in Fig. 5 which is the "add" position, but it may be moved to the "subtract" position shown in dot-and-dash lines.

The machine may be either hand operated or motor-driven, the machine shown in Fig. 5 being operated by the handle 13. When the machine is operated, a main drive shaft 14 is first rocked counterclockwise to give the machine a "forward" stroke of operation after which it returns clockwise to its original position, the latter movement being called the "return" stroke of operation. The two movements constitute what is generally known as a "single cycle of operation" of the machine.

During the forward stroke, a series of actuator racks 15 are released. They move upward under the influence of springs until arrested in differential positions by the engagement of stop bars 16, connected to them, with the stems of depressed amount keys. Each actuator rack carries a type bar 17 that is differentially positioned along with its actuator rack and, after the type bars are positioned, a printing mechanism, of which the hammers 18 are shown in Fig. 5, is operated to print the item on paper carried by the platen P.

The machine illustrated has one register cooperating with the actuator racks 15. The engagement and disengagement of the register is controlled by a pitman 19 which normally occupies the position shown in Fig. 5, in which position the register is not in engagement with the racks. The pitman is reciprocated by means of a drive plate 20 rocked by the drive shaft 14, the drive plate having two studs 21 and 22 for this purpose.

During the forward stroke in an adding operation, the drive plate 20 rocks counterclockwise but the studs 21 and 22 do not engage any part of the pitman 19 to move it. However, the stud 22 passes a pawl 23 pivoted on the upper branch of the pitman and, near the beginning of the return stroke, said stud 22 engages a shoulder on pawl 23 and moves the pitman 19 rearwardly which rocks the register into engagement with the actuator racks. Near the end of the return stroke the stud 21 engages the hooked end 24 of the lower branch of pitman 19 and returns the pitman forwardly to rock the register out of engagement with the actuator racks.

When the sub-total key ST is depressed, its stem depresses the forward end of a pivoted lever 25. When the total key T is depressed, its stem depresses the forward end of a pivoted lever 26 which carries a stud 26a overlying a lower branch of the lever 25 so that the forward end of the lever 25 is also depressed when the total key T is depressed. When the forward end of the lever 25 is depressed, it moves a link 27 downwardly which swings a pawl 28, pivoted on the lower branch of the pitman 19 into the path of the stud 21. Upon depression of the total key T the forward end of lever 25 also depresses the forward hooked end of a pawl 29 pivoted on the upper branch of the pitman 19, and the depression of the pawl 29 also swings the pawl 23 out of the path of the stud 22. Accordingly, when the drive plate 20 rocks counterclockwise during the forward stroke of the machine in total-taking, the stud 21 engages the end of pawl 28 and the pitman 19 is moved rearwardly to move the register into engagement with the actuator racks 15 prior to their ascent. During their ascent, the racks rotate the register pinions back to "0" to take the total from the register, suitable stops, hereinafter described, being provided for arresting the pinions of the register in "0" positions. Near the end of the forward stroke of operation of the machine, the stud 22 engages the hooked end of the pawl 29 and pulls the pitman forward again to rock the register out of engagement with the actuator racks prior to their descent, and thus leave the register pinions in "0" position.

Depression of the sub-total key ST causes the same results as explained above, except that said key does not move the hooked end of the pawl 29 into the path of the stud 22 so that the pitman is not moved forward again at the end of the forward stroke, with the result that the register pinions remain in engagement with the actuator racks 15 during their descent and the total is put back in the register. Near the end of the return stroke the stud 21 engages the hooked end 24 of the lower branch of pitman 19 and rocks the register out of engagement with the actuator racks.

ADD-SUBTRACT REGISTERING MECHANISM

The registering mechanism which is illustrated in the present embodiment of the invention, is of the "tumbling register" type. It comprises two seats of interconnected register pinions. For convenience the lower set 30 (Figs. 7 to 11) will be called the "addition" pinions and the upper set 40 will be called the "subtraction" pinions although, in fact, the two sets of pinions operate together to perform addition and subtraction.

The "addition" pinions 30 are rotatably mounted upon a shaft 31 and the "subtraction" pinions 40 are rotatably mounted upon a shaft 41. The two shafts 31 and 41 are carried by a U-shaped tumbling frame 32 which is fixed to right and left-hand stub shafts 33 journaled in a rockable register frame comprising two arms 34 fastened to a shaft 35 pivoted in the machine side frames, there being suitable cross pieces between the arms. The register pinion shafts 31 and 41 are on opposite sides of the axis of stub shafts 33 about which the U-frame 32 rocks. The register frame 34 is rocked forward and backward to engage and disengage the pinions with the actuator racks 15 by means of the pitman 19 heretofore described. This rocking is accomplished as follows:

Referring to Fig. 5, it will be observed that the pitman 19 is connected to a crank 36 fixed to a shaft 37. Also fixed to this shaft is a cam 38 having a cam slot engaging over a roller 39 on one of the stub shafts 33 that is journaled in the side arms of the register frame 34. When the pitman 19 is moved rearwardly from the position of Fig. 5, the cam 38 cams the roller 39 forward and rocks the register frame counterclockwise to cause the register pinions that are in operative position to engage the actuator racks. When the pitman 19 is pulled forwardly again the cam 38, together with a spring (not shown) returns the register frame clockwise to disengage the register from the actuator racks.

For addition, the tumbling register frame 32 occupies the position shown in Figs. 10 and 11. With the tumbling frame 32 so positioned, the adding pinions 30 are engaged with the racks prior to their descent, and the "addition" pinions 30, in banks where keys have been depressed, are rotated counterclockwise and drive the associated subtraction pinions 40 clockwise as the racks descend to thereby register the item additively.

For subtraction, the tumbling register frame 32 occupies the position shown in Fig. 9. With the tumbling frame 32 in this position, the subtraction pinions 40 are engaged with the racks prior to their descent, and the descent of the racks will rotate the subtraction pinions 40, in banks where keys have been depressed, counterclockwise and this will cause the associated addition pinions 30 to be rotated clockwise, i. e., in the direction opposite to addition. Addition and subtraction are thus performed by rotating the register pinions in opposite directions.

CONDITIONING REGISTER FOR ADDITION AND SUBTRACTION

The machine is conditioned for addition or subtraction under the control of the subtract lever, the machine being, however, normally in addition condition.

The left-hand stub shaft 33 (Fig. 5) is provided with a plate on its left end carrying two studs 42 and 43 which are positioned on opposite sides of the axis of the shafts 33. Cooperating with these studs is a scissors-like latch mechanism comprising members 44 and 45 pivoted on a stud 46 on the left-hand arm of the register frame 34 and urged toward each other by a spring 47. The members 44 and 45 have shoulders for cooperating with their respective studs 42 and 43 and they have lateral lugs 49 and 48 respectively at their forward ends.

Positioned between the lugs 48 and 49 is an arm 50 (Fig. 7) the edges of which are adapted to engage the lugs when the arm is moved up and down. The end of the arm 50 is shaped to engage studs 42 and 43 as will be presently described. This arm 50 projects from a yoke 51 pivoted at 52 on the machine frame. The yoke 51 has another arm 53 having a bifurcated end engaging over a stud 54 on a yoke 55 pivoted at 56 on the machine frame. The latter yoke 55 has an arm that is connected to a link 57 which, in turn, is connected to the subtract lever 12 (Fig. 5).

In Fig. 5, the parts are shown in the positions which they occupy after an operation of the machine in which the subtraction lever was in adding position. The tumbling frame 32 is in the position of Figs. 7, 10 and 11. If, now, the subtraction lever is moved to the subtraction position indicated in dot-and-dash lines in Fig. 5, the link 57 will be moved rearwardly, rocking the yoke 55 counterclockwise, thus rocking the yoke 51 clockwise and moving the rear end of the arm 50 downward to a position in front of the stud 43. During this movement, the arm 50 also engages and moves the lower latch member 45 downwardly to release the stud 43. If the machine is now operated, when the register frame 34 is rocked to engage the register pinions with the actuator racks, the stud 43 is stopped by the end of the lever 50 and the forward movement of the stub shaft 33, therefore, causes the arm carrying the studs 42 and 43, and therewith the stub shaft 33 and tumbling frame 32 to be rocked counterclockwise to position the subtraction pinions 40 for engagement with the actuator racks, such engagement occurring as the counterclockwise movement of the frame 34 is being completed. When the tumbling frame 32 and the arm carrying the pins 42 and 43 are tumbled to subtraction position, the pin 42 moves to a position forwardly of the shoulder on the latch member 44 and the latter is moved downwardly by its spring 47 to position its shoulder behind the stud 42 and thus latch the tumbling frame 32 in subtraction position. If the subtraction lever 12 and arm 50 are in subtraction position during the next operation of the machine, the arm 50 does not act on the stud 43 to cause the tumbling frame 32 to tumble to subtract position because the frame 32 is already in subtract position.

If, now, the subtraction lever 12 is moved to the adding position shown in full lines in Fig. 5, the arm 50 is moved counterclockwise to its Fig. 5 position and lifts the forward end of the latch member 44 to disengage the latch member from the stud 42, and the forward end of the arm 50 is positioned in front of the stud 42 to block forward movement of the latter. Therefore, as the register frame 34 swings counterclockwise during the operation of the machine to engage the register with the actuator racks, the stub shaft 33 and the tumbling frame 32 will be rocked clockwise to the addition position to position the adding pinions 30 for engagement with the actuator racks 15. As the tumbling frame 32 tumbles to addition position, stud 43 moves forward to a position in front of the shoulder of the lower latch member which, thereupon, is snapped upwardly by the spring 47 to latch the stud 43 and hold the tumbling frame in the addition position when the register frame is subsequently rocked clockwise to disengage the register from the actuator racks so that the tumbling frame 32 remains in addition position until the machine is again operated with the subtraction lever in subtraction position.

TENS-TRANSFER MECHANISM

For reasons which will be explained further on in connection with the elimination of the "fugitive 1" error, the transfer mechanism in the numerical orders other than the units order and the highest order, which will be referred to again, is of a known construction of the type which causes the pinions in said orders intermediate the units order and highest order to be arrested at their "0" positions in positive total-taking but at their "9" positions in negative total-taking.

Figure 7:
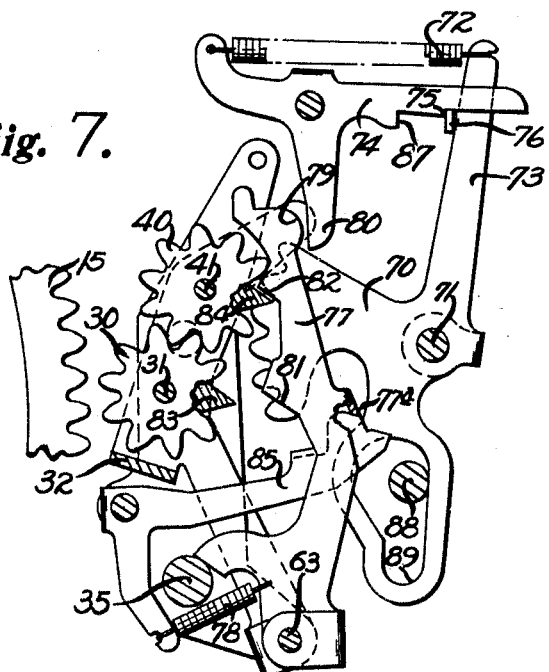
Fig. 7 is a partial vertical section and elevation taken lengthwise of the machine, through the registering and tens-transfer mechanisms immediately to the right of the register pinions in an order above the units order and below the highest order, the register frame being shown in the position occupied after adding operations and positive total taking operations.
Figure 8:
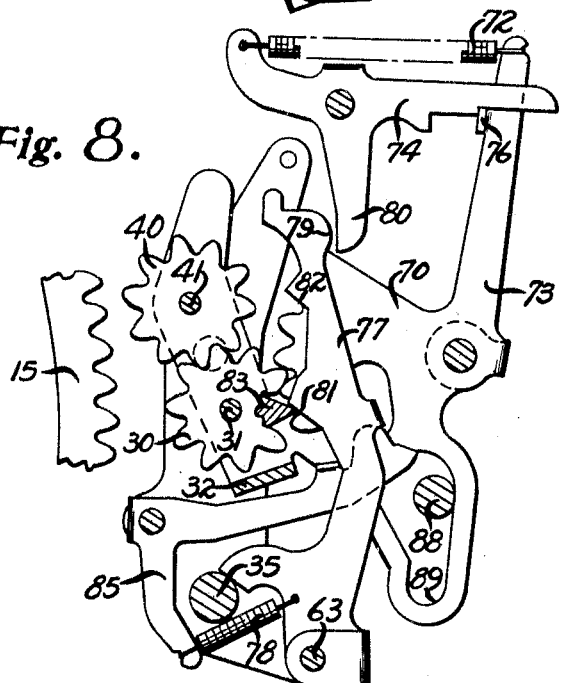
Fig. 8 is a view similar to Fig. 7 except that the register frame is in the position occupied after subtracting operations and negative total taking operations.

As illustrated in Figs. 7 and 8, the transfer mechanism for the numerical orders of the register intermediate the units and highest orders is substantially that shown in Patent No. 1,853,053. Each of said numerical orders of the transfer mechanism includes a toothed tens-transfer segment 70 with a sufficient number of teeth to permit it to be engaged by either the "addition" or the "subtraction" pinion for said numerical order, depending upon which pinion is in position for such engagement when the register is rocked rearwardly out of engagement with the actuator racks. This tens-transfer segment serves to hold the pinions of the corresponding numerical order against accidental rotation while the register is disengaged from the racks 15, as well as to impart a tens-transfer to said pinions in response to the passage of the pinions in the next lower order through the interval between "9" and "0." For the latter purpose, the transfer segment is pivoted on a shaft 71 and urged counterclockwise as viewed in Fig. 7 by a spring 72 connected to the arm 73 of the segment. It is normally detained against such movement, however, by a latch 74 having a shoulder 75 engaging a lug 76 on the arm 73 of the transfer segment.

The latch 74 for each transfer segment 70, excepting the segment which cooperates with the units order pinions, is released by means of a trip pawl 77 pivoted on shaft 63 and urged counterclockwise by a spring 78, said pawl having a shoulder or nose 79 on its upper end positioned to engage a downwardly extending projection 80 on the latch 74. The trip pawl 77 has two cam noses 81 and 82, the cam nose 81 cooperating with a transfer projection comprising a wide tooth 83 on the pinion 30 of the next lower numerical order and the cam nose 82 cooperating with a transfer projection comprising a wide tooth 84 on the pinion 40 of said lower numerical order. Briefly, the operation is as follows:

Assume that the register pinions are in the position shown in Fig. 7 and that addition is to be performed. As the machine is operated the pinions 30 will move into engagement with the actuator racks just prior to their descent. This moves the pinions 40 away from the transfer mechanism. Assume that one of the pinions 30, say the tens order pinion 30, is rotated from or through its positive "9" position to or through its positive "0" position as the racks descend. When this occurs, the transfer projection 84 on the pinion 40 which is geared to 30, acts on nose 82 and pushes the trip pawl 77 rearwardly. The trip pawl 77 is latched in this position by a latch 85 that is urged upwardly by the spring 78 behind a lateral lug 77ᵃ on the trip pawl 77.

When, near the end of the return stroke of the machine, the register frame 34 is rocked to disengage the pinions 30 from the actuator racks and engage the pinions 40 with the transfer segments 70, the pawl 77 which is latched in its rearward position engages the arm 80 of the latch 74 and swings the latch upwardly to release the transfer segment 70 meshing with the pinion 40 for the next higher order, whereupon said transfer segment 70 moves counterclockwise under the influence of its spring 72, the movement being limited to one step by a shoulder 87 on the latch 74, so that the pinion 40 and, thereby, the pinion 30 are rotated one step or unit in the adding direction.

In its transfer movement, the transfer segment 70 engages a laterally projecting lug 86 on the latch 85 and rocks the latch clockwise back to the normal position of Fig. 7 to release the trip pawl 77 which is then restored to normal position by its spring 78.

The moved transfer segments are restored to normal as the register is moved into engagement with the actuator racks during the next operation of the machine by a restoring bail 88 which cooperates with the cam slots 89 in the lower portions of the transfer segments. The bail 88 is moved downwardly to the narrow ends of the cam slots 89, by means not shown, whenever the register frame 34 is rocked to engage the register with the actuator racks, and is returned upwardly to its Fig. 7 position as the register frame 34 is rocked to disengage the register from the actuator racks. In adding operations the restoration of the tripped transfer segments occurs at the beginning of the return stroke of the machine, whereas in total-taking operations it occurs at the beginning of the forward stroke because the controls of the machine are then conditioned so that the registers are rocked into engagement with the actuator racks at the beginning of the forward stroke.

In subtraction the operation of the transfer mechanism is the same as in addition excepting that, in adding operations, the transfer projection 83 on the addition pinions 30, act on the cam noses 81 to set the pawls 77, and the segments 70 mesh with the addition pinions 30 so that the step or unit of movement imparted to the register pinions of any numerical order if the subtraction pinion 40 of the next lower order has been rotated from or through its negative "9" position to or through its negative "0" position, is in the subtractive direction.

In total taking, the movement of the actuator racks and thereby the indexing of the type bars 17, is controlled by the register pinions. In positive total taking, the control lever 12 and arm 50 are in addition position so that the adding pinions 30 will be engaged with the racks 15 and the rotation of the register pinions is limited by engagement of transfer projections 84 on the subtract pinions 40 with the noses 82 on the transfer pawls. In negative total taking, the lever 12 and arm 50 are in subtraction position so that the subtracting pinions 40 are engaged with the racks 15 and the rotation of the register pinions is limited by engagement of the projections 83 on the adding pinions with the noses 81 on the transfer pawls. During total taking, therefore, the transfer pawls 77 must be held against being moved from their normal positions by the action of the transfer projections 83 or 84 on the cam noses 81 and 82. For this purpose the lever 25, which is swung counterclockwise from its Fig. 5 position when the total key T or the sub-total key ST is depressed, carries at its rearward end a pawl 94 which is moved upwardly to a position in front of a crank pin 95 connected to a shaft 97 (Fig. 9) carrying a comb plate 98. This shaft and comb plate are carried by the upper ends of the side arms of the register frame 34 so that, as the register is rocked into engagement with the actuator racks, while the pawl 94 is positioned to engage the wrist pin 95, the comb plate 98 is rocked clockwise to a position immediately behind the upper extensions of the trip pawls 77 so as to prevent them from moving rearwardly. The result is that, when the wide faced teeth 83 or 84 of the register pinions reach the noses 81 or 82, the pinions are arrested because the wide faced teeth can not cam the trip pawls 77 rearward. When the register frame is rocked rearwardly again to disengage the pinions from the actuator racks, the comb plate moves back to normal under the influence of a spring (not shown).

A transfer segment 70 formed and operating as above described is provided for cooperating with the pinions 30 and 40 of the highest order of the register. A transfer segment of similar form is also provided for the units order pinions 30 and 40 and a latch like the latches 74 in the higher orders cooperates with the units order transfer segment 70, but there is no pawl 77 to release the latch 74 for the units order segment 70, and the latter serves only the purpose of holding the units order pinions against rotation at all times while the register is out of engagement with the racks 15. In other respects, however, the construction in the units order and highest order differs from the construction in the intermediate orders just described.

Avoiding the "Fugitive 1" Error

As already explained, the "fugitive 1" error is the net difference between two errors of opposite algebraic sign, namely, the "transfers error," of the same sign as the total, caused by operation of the tens-transfer mechanism, and the "total-taking error," of algebraic sign opposite to the sign of the total, resulting from the stopping of the pinions, in total-taking, in positions one step short of those from which they started in accumulating the total, and exceeding the "transfers error" in absolute value by "1" in the "units" order so that the net difference amounts to "1" in the "units" order and is of the algebraic sign opposite to the sign of the total. These two errors, or the difference between them, are not corrected in the present invention by the insertion of compensating amounts into the register, and the two errors are not to be suppressed. Instead, the plan of the invention is to modify the construction in a manner which will so affect the errors that the absolute values of the two errors will, in every case, be equal, and the net difference between the values of the two errors, which otherwise would have to be corrected if it were not to show in the printed total will be nil.

One of the measures employed for equalizing the transfers error and total-taking error and thus eliminating the net "fugitive 1" error involves provision of means for causing the units order pinion of the register to be arrested in its "positive 0" position in direct negative total taking as well as in positive total taking. In the embodiment of the invention later described in detail and illustrated in the drawings, the transfer projection on the units order transfer pawl is arranged for adjustment for that purpose. As the total-taking error is always of the sign opposite to the algebraic sign of the total and previously always included "1" in the units order of the register whenever a negative total was taken by rotating all of the pinions to their "positive 9" positions in direct negative total taking after they had started from their "positive 0" positions in accumulating the negative total as well as in taking a positive total by rotating the pinions to their "positive 0" positions after they had started from their "positive 9" positions in accumulating a positive total, but the transfers error was always "0" in the units order, and no errors whatever were encountered when the register pinions started from the "positive 0" positions in accumlating a positive total which was drawn by returning the register pinions to their "positive 0" starting positions or when the pinions started from their "positive 9" positions in accumulating a negative total which was drawn by returning the register pinions to their "positive 9" starting positions in the direct negative total-taking direction, it will be apparent that the above-stated measure will cause the total-taking error also to be always "0" in the units order and thus equal to the transfers error in the units order. As the transfers error and the total-taking error previously were always equal in the higher orders of the register, even though the pinions might sometimes be started from their "positive 0" positions in accumulating a negative total which was drawn by rotating the register pinions in the direct negative total-taking direction to their "positive 9" positions and might sometimes start from their "positive 9" positions in accumulating a positive total which was drawn by rotating the pinions in the positive total-taking direction to their "positive 0" positions, the previous practice of arresting the register pinions in the orders above the units order in their "positive 9" positions in direct negative total taking will be adhered to. However, in order to determine whether the totals obtained from the register when the above-mentioned measures are employed will always be correct also in orders higher than the units order, certain conditions which occur in the register must be fully considered.

If the transfer projection on the units order transfer pawl were to be shifted under any conditions and at any time except when the units order register pinion is in its "positive 0" position (now also its "negative 0" position), the shifting of said transfer projection would have no effect on the total-taking error in any orders higher than the units order and, in order to preserve the equality between the total-taking error and the transfers error in orders above the units order, the shifting of said transfer projection under such condition and at such time should not cause any alteration in the transfers error.

However, the units order pinion may stand in its "positive 0" position at a time when the transfer projection on the units order transfer pawl is shifted either to the position for arresting the units order pinion in its "positive 0" position in negative total taking, or to the position for arresting said units order pinion in its "positive 0" position in positive total taking. This may occur upon an odd number or an even number of changes of algebraic sign of the total in the register. When it occurs upon an odd number of changes of sign of the total in the register, the result will be that, whereas said units order pinion would have been permitted nine steps of rotation if the total had been taken without so shifting the transfer projection on the units order transfer pawl, the units order pinion will not be permitted to rotate at all when the total is taken after so shifting the transfer projection on the units order transfer pawl. For reasons previously explained, this would result in decreasing the total-taking error of the algebraic sign opposite to that of the total from "1" to "0" in the units order while simultaneously increasing the total-taking error from "0" to "1" in the tens order of the register in which there would otherwise have been no error because of the pinion standing in the "0" position from which it started in accumulating the total. In other words, the total-taking error will not be altered except that a tens-transfer, as will be explained later, may shift the tens order pinion into its starting position or alternatively shift the tens order and possibly some consecutively higher order pinions out of their starting positions and possibly simultaneously shift the next higher order pinion into its starting position. However, for reasons already explained, shifting the tens or any higher order pinion into its starting position in such circumstances will change the total-taking error from "0" to "1" in such an order while simultaneously reducing the total-taking error from "1" to "0" in the next higher order. Also, the moving of the tens order and any higher order pinions out of their starting positions under such circumstances will, also for reasons already explained, change the total-taking error in each order immediately to the left of such an order from "0" to "1." Thus, the whole total-taking error will now be "1" in each order which is immediately to the left of any order in which the pinion does not stand in the position from which it started in accumulating the total, always "1" in the tens order and "0" in all other orders, including the units order, and the error will remain of the algebraic sign opposite to that of the total.

If the transfers error were permitted to remain unaltered, the transfers error and total-taking error would no longer be equal in the tens order when the units order pinion stands in its "0" position. Therefore, measures must be adopted to alter the transfers error in the tens order when the units order pinion stands in its "0" position and the total-taking error is altered in that order by the shifting of the transfer projection on the units order transfer pawl. For this purpose, the transfer projection on the units order transfer pawl will be shifted in such a way that if the units order pinion is in its "0" position at the time of such shifting, the transfer projection on the units order pinion and the transfer projection on the units order transfer pawl will cooperate in such a way as to cause a tens-transfer to the tens order of the register. In case the tens order pinion also stands in its starting "0" position, a tens-transfer to the next higher order will be effected. In any case, the chain of tens-transfers will end with and only with a transfer to the lowest order in which the pinion does not stand in its starting "0" position. Furthermore, in order that such a tens-transfer to the tens order will be in the proper direction to balance the alteration in the total-taking error, the shifting of the tens-transfer projection on the units order transfer pawl will be effected only at a time when it will increase the transfers error of the same algebraic sign as the total by "1" in the tens order. In other words, the transfer projection on the units order transfer pawl will be shifted only while the register and transfer mechanism are in subtracting condition if the total changes from positive to negative and only while the register and transfer mechanism are in adding position if the total changes from negative to positive. As the register and transfer mechanism are always in subtracting condition during an operation in which an amount causing the sign of the total in the register to change from positive to negative is entered in the register and is always in adding condition in an operation in which an amount changing the sign of the total in the register from negative to positive is entered in the register, the transfer projection on the units order transfer pawl will be shifted, in the manner indicated, during the operation in which an amount changing the sign of the total in the register is entered in the register. This will not, at the time of shifting of the transfer projection on the units order transfer pawl, cause any change in the transfers error in orders other than the order except as the tens order pinion may be moved into its starting position or the tens order pinion and possibly the pinions in some consecutively higher orders may be moved out of their starting positions and possibly the next higher order pinion may simultaneously be moved into its starting position. However, for reasons previously explained, the shifting of the tens or a higher order pinion into its starting position under such circumstances will result in the transfers error being changed from "1" to "0" in the next higher order. Also, the shifting of the tens and any higher order pinions out of their starting positions will, for reasons previously explained, change the transfers error from "0" to "1" in each order immediately to the left of such an order. Thus, the whole transfers error will now be "1" in each order which is immediately to the left of any order in which the register pinion does not stand in its starting position, always "1" in the tens order, and "0" in all other orders including the units order, and will remain of the same algebraic sign as the total. The thus altered transfers and total-taking errors will cancel each other if a total is taken immediately after an odd number of changes of sign.

The shifting of the transfer projection on the units order transfer pawl at the time the sign of a total in the register changes will result in changing the time at which tens transfers from the units order to the tens order will be effected during further adding and subtracting operations performed on the register between the time the sign of the total in the register changes and the time when the total is taken from the register, and it is, therefore, necessary to determine whether and how such change in the timing of tens transfers from the units to the tens order will affect the transfers and total-taking errors.

In a usual register with fixed transfer projections on the units order transfer pawl, the "negative 0" position of the units order pinion as well as of all the pinions in higher orders corresponded to the "positive 9" position, and accordingly, the "positive 0" position corresponded to the "negative 9" position. Therefore, whether the register contained a positive or a negative total after an odd or an even number of changes of algebraic sign, tens-transfers from the units order to the tens order occurred when the units order pinion rotated through the interval between its "positive 9" ("negative 0") position and its "positive 0" ("negative 9") position. If a tens-transfer from the units to the tens order occurred while the register contained either a positive or a negative total after an odd number of changes of sign, that is, after the pinions started from their "positive 0" ("negative 9") positions in accumulating a negative total or from their "negative 0" ("positive 9") positions in accumulating a positive total, a tens-transfer from the units order to the tens order would occur upon the first step of rotation of the units order pinion from its starting position in the direction corresponding to an increase in the absolute value of the total but only upon the tenth step of rotation in the direction corresponding to a decrease in the absolute value of the total. Such incorrect timing of the tens-transfers from the units order to the tens order after an odd number of changes of sign in the total caused the transfers error in the tens order to change from "0" to "1" and back again from "1" to "0" as the units order pinion moved out of and into its starting position. Likewise, after an odd number of changes of sign of the total in such a register, the first step of rotation of the units order pinion in the direction corresponding to an increase in the total was from a position from which the pinion could rotate nine steps in a total-taking operation for directly drawing a total of the sign of that contained in the register, to a position from which the pinion could not rotate at all in such a total-taking operation, and further, the tens-transfer to the tens order, if the latter was in its starting position, would result in moving the tens order pinion from a position from which it could rotate nine steps in such a total-taking operation, to a position from which the tens order pinion could not rotate at all in such a total-taking operation. This resulted in the changing of the total-taking error from "0" to "1" in the tens order as the units order pinion moved out of and into its starting position after an odd number of changes of sign of the total in the register.

With the new construction wherein the transfer projection on the units order transfer pawl is shifted in the manner above stated, the shifting of said transfer projection upon an odd number of changes of sign in the register always causes the transfers error and the total-taking error (of opposite algebraic signs) both to be always "1" in the tens order, both to be always "0" in the units order, and always of equal absolute values immediately after the shifting of the transfer projection on the units order transfer pawl at the time of the odd numbered change of sign in the register, all as already shown. Also, the shifting of the transfer projection on the units order transfer pawl causes the "positive 0" position and the "negative 0" position of the units order pinion to be identical so that, after either an odd or an even number of changes of sign in the register, tens-transfers from the units order to the tens order are effected upon the tenth step of rotation of the units order pinion away from its "0" position in the direction corresponding to an increase in the absolute value of the total in the register and upon the first step of rotation of the units order pinion away from its "0" position in the direction corresponding to a decrease in the value of the total. This timing of the tens-transfers is correct and will not cause any variation of the transfers error either in the units order or in the tens order and cannot cause the transfers error in the higher orders to be other than "1" in each of said higher orders which is immediately to the left of any order in which the pinion is not in its starting position and "0" in all others of the orders above the tens order, during further add and subtract operations on the register which are performed after an odd number of changes of sign in the register but do not cause another change of sign. Further, the shifting of the transfer projection on the units order transfer pawl after an odd number of changes of sign of the total in the register produces the result that the units order pinion, while it remains in its "0" position, cannot rotate at all in a total-taking operation for taking a total of the sign of that currently contained in the register but, upon movement in either direction from its "0" position, can rotate in such a total-taking operation the number of steps which corresponds to the numeral in the units order of both the correct and indicated totals, so that the total-taking error will remain "0" in the units order and the new correct timing of the tens-transfers from the units to the tens order after an odd number of changes of sign in the register cannot cause any changes in the total-taking error in the tens order and cannot cause the total-taking error in any higher orders to be other than "1" in each of such higher orders which is immediately to the left of any order in which the pinion does not stand in its starting position and "0" in all others of such higher orders. Thus the altered transfers and total-taking errors of opposite algebraic sign will always be of equal absolute value after any number of further amount entering operations on the register which are performed after an odd number of changes of sign in the register but which do not cause any further change of sign.

In a register of the prior construction with a fixed transfer projection on the units order transfer pawl, the transfers error which became apparent when considering the distances of the register pinions away from their starting positions in the direction of rotation corresponding to an increase in the absolute value total (opposite to the total-taking direction of rotation) after an odd number of changes of sign in the register, disappeared upon an even numbered change of sign because of the reversal of the direction corresponding to an increase in the absolute value of the total. Also, after an even numbered change of sign, there would be no total-taking error because the pinions would return to their starting positions in total taking. With the new construction, there is never any error in the units order, and the shifting of the transfer projection on the units order transfer pawl upon an even numbered change of sign cancels the transfers error in the tens order if the units order pinion is in its "0" position, which is the only time at which the transfers error in the tens order would not disappear as a result of the reversal of the direction of rotation corresponding to an increase in the absolute value of the total in the register. Also, upon the shifting of the transfer projection on the units order transfer pawl upon an even numbered change of sign, the potential total-taking error in the tens order is cancelled by a tens-transfer which is effected if the units order pinion stands in its "0" position, which is the only time when a total-taking error in the tens order would not be avoided by returning the tens order pinion to its starting position in total taking. In all orders above the tens order, the transfers error disappears because of the reversal of the direction of rotation of the pinions corresponding to increase of the absolute value of the total in the register upon the even numbered change of sign, and the total-taking error is avoided by returning the pinions to their starting positions in total taking. Thus, upon an even number of changes of sign in the register with the new provisions, the transfers and total-taking errors both disappear under all circumstances even though the value of at least the potential total-taking error was affected by the new provisions in the amount entering operation in which the preceding odd numbered change of sign occurred, and possibly in subsequent amount entering operations preceding the even numbered change of sign.

From all of the foregoing it follows that a register with the above-stated new provisions will yield correct algebraic totals in direct total taking under all circumstances which can arise.

MECHANISM FOR ELIMINATING
THE "FUGITIVE 1" ERROR

The above-explained elimination of the "fugitive 1" error is obtained by the novel construction illustrated in Figs. 9, 10 and 11.

Referring first to Fig. 7, when a positive total is taken from the addition pinions 30, they are engaged with the racks 15 before the latter ascend, which means that the pinions are rotated clockwise as the racks move upwardly. In this particular machine the addition pinions are not arrested in their "0" positions by the tens-transfer projections 83 on them, but rather by the tens-transfer projections 84 on the subtract pinions 49 that mesh with the addition pinions. In total taking, the transfer projections 84 move around until they contact the underside of the noses 82 on the transfer pawls 77 which are locked against movement when the machine is conditioned for taking a total.

Referring to Fig. 8, when a negative total is taken, the subtraction pinions 49 are engaged with the racks 50 before the latter ascend. The subtract pinions are thus rotated clockwise as the racks move upwardly. These pinions are not arrested by the tens-transfer projections 84 on them, but rather by the tens-transfer projections 83 on the addition pinions 30. In negative total taking, these projections 83 move up against the underside of the noses 81 on the tens-transfer pawls 77 that are locked when the machine is conditioned for taking a negative total.

The noses 81 and 82 are integral with the tens-transfer pawls 77 and occupy certain definite positions in all orders except the "units" order. For add operations and positive totals, the noses in the "units" order occupy the same relative positions as those shown for the noses 81 and 82, but provision is made for changing the position of the noses in the "units" order as illustrated in Figs. 9 to 11, inclusive.

Instead of having two integral noses 81 and 82 as have the transfer pawls 77 in all higher orders, the "units" order transfer pawl 77' has, as shown in Figs. 9 and 11, two movable noses 100 and 101 pivoted on studs 102 and 103, respectively, and geared together so that when one is moved, the other also will move.

To enable the noses 100 and 101 to be shifted, the nose 101 has a rearward extension carrying a stud 104 located in a tapering slot 105 in an arm 106 of a yoke 107 pivoted on the shaft 71. The lower edge 111 of the slot 105, forwardly of the position occupied by the stud 104 in Fig. 9, is an arc having the shaft 35 as its center when the yoke 107 is in its Fig. 9 position. The upper edge 110 of the slot 105, forwardly of the position occupied by the pin 104 in Fig. 11, is an arc having the shaft 35 as its center when the yoke 107 is in its Fig. 11 position. The units order transfer pawl 77' is pivoted on the shaft 35, about which the register rocks in moving into and out of engagement with the actuator racks 15, instead of on the shaft 63, on which the pawls 77 for the higher orders are pivoted, so that the setting of the units order pawl 77' in transfer position will not alter the distance of the pin 104 from the shaft 35.

During operations of the machine, the tens-transfer pawl 77' in the units order is given certain movements. For example, it may be set by a tens-transfer so that it is moved slightly clockwise where it is held by its latch 85. Afterwards, the register may be rocked out of engagement with the racks, whereupon the pawl 77' moves clockwise with the register. Since the arm 106 is pivoted on the shaft 71 which does not move bodily under these conditions, it becomes necessary to have the stud 104 movable relative to the arm 106, and the slot 105 has been provided for this purpose. It is also necessary that the noses 100 and 101 remain in proper position during this movement. Accordingly, the "units" pawl 77' has been pivoted on the shaft 35 instead of the shaft 63 on which the pawls in the other orders are pivoted, the pawl being urged counterclockwise by a spring 78' and limiting against shaft 63. The pawl 77' thus swings about the same center as the register frame. Also, the upper edge 110 of the cam slot 105 is formed as an arc whose center is the center of the shaft 35, the arc being formed while the arm 106 is in the position of Fig. 11. The lower edge 111 of the cam slot is part of an arc about the same center, but with the arm 106 in the position of Fig. 9. Thus, with the parts in the position of either Fig. 9 or Fig. 11, the tens-transfer pawl 77' may be moved and the register may be rocked into and out of engagement with the racks without affecting the position of noses 100 and 101.

The positions of the noses 100 and 101 for positive totals are shown in Fig. 11 in which the upper edge 110 of the slot 105 holds the pin 104 at the lower limit of its movement about stud 103 and thus holds the nose 101 against a limit pin 109 on the pawl 77'.

When a negative total is to be taken, the noses 100 and 101 are moved to the position of Fig. 9 where the lower edge 111 of the slot 105 holds the stud 104 at the upper limit of its movement about stud 103 and thus holds a part of nose 100 against the limit pin 108 on pawl 77'. This movement, with respect to the position of Fig. 11, amounts to moving the nose 100 upwardly and the nose 101 downwardly, the movement of each nose being equivalent to one step of movement of the register pinions. When a negative total is taken, the pinions 30 are rotated counterclockwise as viewed in Fig. 9. The "units" pinion will be arrested by its tens-transfer projection 83 engaging the lower side of the nose 100. But, the nose 100 is, under the conditions just explained, one step above the positions that the noses 81 in the other orders occupy, and thus the "units" pinion is allowed to move one step farther than the other pinions.

At this point attention is directed to the fact that the change in the position of the noses 100 and 101 does not interfere with their action in effecting tens-transfers during subsequent operations.

The positive total positions (Fig. 11) of the noses 100 and 101 correspond to the fixed positions of the noses 81 and 82, respectively, on each higher order pawl, so that during adding and subtracting operations on the register while the noses 100 and 101 are in these positive total positions, tens-transfers from the units order to the tens order will occur at the same time and in the same manner as though the units order pawl had the usual fixed noses 81 and 82 like those of the higher order pawls 77. Also the nose 101 will engage the transfer projection 84 of the units order subtract pinion 40 to arrest the units order pinions at "0" in positive total taking.

The negative total positions of the noses 100 and 101 are, as illustrated in Fig. 9, such that the nose 100 will be engaged by the transfer projection 83 of the units order add pinion 30 to arrest the units order pinions at "positive 0" in direct negative total taking as distinguished from the "positive 9" position in which a normal pawl would arrest said pinion. During adding and subtracting operations on the register while the noses 100 and 101 are in these negative total positions, tens-transfers from the units order to the tens order will occur upon the passage of the units order pinions through the interval between the "positive 0" and the "positive 1" position. However, it might be said that the "positive 0" and the "negative 0" positions of the units order pinion are identical and that the "positive 1" position corresponds to the "negative 9" position so that the tens-transfer from the units order to the tens order occurs as it should while the units order numeral of the negative total is passing through the interval between "9" and "0."

The noses 100 and 101 are shifted from their Fig. 11 positions to their Fig. 9 positions and vice versa by rocking the yoke 107. The shifting of the noses 100 and 101 should occur while the register pinions are engaged with the transfer segments 70 because the units order pinions should be held against rotation while the noses 100 and 101 act on the transfer projections. In order to hold the units pinions the transfer segment 70 in the units order, which is not necessary for tens-transfer, is continuously latched by its latch 74. Action of the nose 100 and the projection 83 upon each other, or action of the nose 101 and the projection 84 upon each other, can occur only when the units order pinions are in their "0" positions. When it occurs with the units pinion latched, the units order transfer pawl 77' is rocked to release a transfer to the tens order, as will be clear by reference to Fig. 11. For reasons previously stated, the shifting of the noses 100 and 101 from positive total to negative total position is to occur in an operation in which the sign of the total in the register changes from positive to negative, and the shifting of the noses 100 and 101 from negative total to positive total position is to occur in the operation in which the sign of the total in the register changes from negative to positive. To meet these requirements the rocking of the yoke 107 is effected under control of the register tumbling frame 32 and of the register pinions of highest order.

The register pinions of highest order (Fig. 10) have projections 83x and 84x respectively cooperating with a pawl 77x, these parts corresponding to the tens-transfer projections and the tens-transfer pawls in the other orders. The left end of the yoke 107 (Fig. 10) is pivoted on the shaft 71 to the left of the transfer segment 70 (not shown in Fig. 10) for the highest order pinions. Said yoke has oppositely extending portions with laterally projecting lugs 113 and 114 on them (Fig. 10). A slide 120, with abutments 121 and 122 for operating on the lugs 113 and 114, is movably supported on a transfer pawl 77x for the highest order by headed pins 123 passing through slot 124. The transfer pawl 77x is otherwise the same as the transfer pawls 77 in the lower orders excepting the units order. When it is cammed rearwardly by either of the transfer projections 83x and 84x acting on one of its noses 81 or 82 while the register is engaged with the racks 15, it also is latched in its set position by a latch 85x. In order that this latch 85x for the pawl 77x may be moved to release the pawl 77x as the lower order pawls 77 are released, the pawl 77x controls a latch 74x for an extra transfer segment 70x (Fig. 10), mounted to the left of the transfer segment 70 for the highest order pinions.

Slide 120 is connected by a link 130 with one arm 131 of a yoke 132 pivoted on the shaft 63. This yoke has another arm 133 with a bifurcated end straddling a stud 134 on an arm 135 integral with the tumbling frame 32. In Fig. 10 the slide 120 is in the elevated position it occupies when the register tumbling frame is in the position for addition or positive total taking.

When the left end of the yoke 107 is in the position of Fig. 10, the right end of the yoke is in the position of Fig. 11, that is, the yoke 107 is in its positive total position. The yoke 107 is releasably held in either one of its two positions in which it happens to be, by a detent comprising an arm 115 pivoted on the yoke 107 and urged by a spring 116 to engage a nose on said arm 115 in one or the other of two notches 117 and 118 in a stationary plate 119. The rocking of the yoke 107 occurs as follows:

When the sign of the total in the register changes from positive to negative, the highest order pinions are rotated through, or from, their "0" positions to, or through, their "9" positions. This can happen only during a subtracting operation and accordingly the tumbling frame 32 will have been tumbled from its Fig. 10 and Fig. 11 position to its Fig. 9 position. Consequently, the yoke 132 will have been rocked clockwise from its Fig. 10 position, drawing the link 130 and slide 120 downwardly to a position such that the abutment 122 is in alignment with lug 114. If the rotation of the highest order pinions through the interval between "0" and "9" occurs while the register is engaged with the actuators 15, the pawl 77x will be latched in the set position to which it is cammed by the transfer projection 83 of the highest order add pinion 30 acting on the nose 81 of the pawl 77x. Then, when the register is rocked clockwise about shaft 35 and disengaged from the racks 15 near the end of the subtracting operation, the pawl 77x and slide 120 will be moved rearwardly (to the right in Fig. 10) beyond the position shown in Fig. 10. If at this time the yoke 107 is in the position of Figs. 10 and 11, the abutment 122 will act on lug 114 to rock the yoke 107 clockwise to its Fig. 9 position, to change the noses 100 and 101 from positive to negative position. The nose of the detent 115 is cammed out of notch 118 against the action of the spring 116 which draws the nose of the detent 115 into the notch 117 as the yoke 107 enters its Fig. 9 position.

In the position of the parts shown in Fig. 10, the register is in addition position. If the capacity of the register should be exceeded in an add direction, the tens-transfer projection 84x on the highest order pinion would set the pawl 77x and the latter, when the register is rocked out of engagement with the racks, would move the abutment slide 120 rearwardly. But the abutment 122 is not in line with the lug 114, and the yoke 107 would not be moved. The abutment 121 is in line with lug 113 but the yoke 107 is already in addition position so no movement occurs. In other words, when the capacity of the register is exceeded, the mechanism will not be set.

When the sign of the total in the register changes from negative to positive, the highest order pinions are rotated from or through their "9" positions to or through their "0" positions. This can happen only during an adding operation and accordingly the tumbling frame 32, the yoke 132 and the slide 120 will be in their Fig. 10 positions at the time. The abutment 121 will, therefore, be in alignment with the lug 113. If the rotation of the highest order pinions through the interval between "9" and "0" occurs while the register is engaged with the actuators 15, the pawl 77x will be latched in the set position to which it is cammed by the transfer projection 84 of the highest order subtract pinion 40 acting on the nose 82 or pawl 77x. Then, when the register is disengaged from the racks 15 near the end of the adding operation, the pawl 77x and slide 120 will be moved rearwardly beyond the position shown in Fig. 10. If at this time the yoke 107 is in the negative total position of Fig. 9, the abutment 121 will act on the lug 113 to rock the yoke 107 to the positive total position of Figs. 10 and 11 where it will again be releasably held by the detent 115, and the noses 100 and 101 will be moved accordingly.

If, while the register is in subtract position, its capacity should be exceeded in a subtract direction, the pawl 77x would be set and the slide 120 with the abutments 121 and 122 moved rearwardly. At that time, the abutment 122 would be in line with the lug 114, but the yoke 107 is already in its negative total position and no movement would occur. Thus, no operation of the mechanism occurs when the capacity of the register is exceeded in a subtract direction.

The rotation of the highest order pinions through the interval between "9" and "0" in either direction can occur while the register is disengaged from the actuators and engaged with the transfer segments and in that case it is the result of a tens-transfer from the next lower order. When the passage of the highest order pinions through the interval between "9" and "0" occurs under such circumstances one of the transfer projections on the highest order pinions will cam the transfer pawl 77x rearwardly beyond its Fig. 10 position so that the abutment 121 or 122 will engage the lug 113 or 114 and rock the yoke 107 if the tumbling frame 32 is in subtract position and the yoke 107 is in the positive total position of Figs. 10 and 11, or if the tumbling frame 32 is in the adding position of Fig. 10 and the yoke 107 is in the negative total position of Fig. 9 at the time.

At any time when the highest order transfer pawl 77x is rocked rearwardly of its Fig. 10 position by the rocking of the register out of engagement with the actuator racks 15 after the pawl 77x has been set by the transfer projection 83 or 84 on the highest order pinions and has been latched in set position by its latch 85, or when the transfer pawl 77x is rocked rearwardly of its Fig. 10 position by passage of the highest order pinions through the interval between "9" and "0" while the register is engaged with the transfer segments, the pawl 77x will also operate the latch 74x for the extra transfer segment 70x which will be moved counterclockwise (Fig. 10) by its spring 72 whereupon the lower end of its toothed portion will engage the lateral projection 86 on the highest order latch 85 and move the latter to releasing position, permitting the highest order transfer pawl 77x to return to normal position.

From Fig. 10 it can be seen that the rocking of the yoke 107 and thus also the shifting of the noses 100 and 101 from their positive total positions to their negative total positions can occur only while the register is engaged with the transfer segments and the tumbling frame 32 is in subtracting position. Likewise, the rocking of the yoke 107 and thus the shifting of the noses 100 and 101 from their negative total positions to their positive total positions can occur only when the tumbling frame 32 is in adding position and the register is engaged with the transfer segments. Thus, if the "units" order pinions happen to be at "0" at the time the noses 100 and 101 are shifted from positive total position to negative total position, the nose 100 acting against the transfer projection 83 on the "units" order add pinion will, in moving from the lower side of the transfer projection to the upper side of the transfer projection as in Fig. 9, cam the "units" order pawl 77' rearwardly and the latter will release the latch 74 for the "tens" order transfer segment 70 to cause a subtractive tens transfer to the "tens" order pinions. The latched "units" order transfer segment 70 prevents the "units" order pinions from being rotated by the nose 100. If the "units" order pinions happen to be at "0" at the time the noses 100 and 101 are moved from negative total position to positive total position, the nose 101, in moving from the lower side to the upper side of the projection 84 on the "units" order subtract pinion 40, will act against the projection 84 and also cam the pawl 77' rearwardly to release the latch 74 for the "tens" order transfer segment 70 and cause an additive tens transfer to the "tens" order pinions. The slot 105 in the arm 106 extends rearwardly of the normal position of the pin 104 sufficiently to accommodate the rearward movement of the pawl 77' for releasing the latch 74 for the "tens" order transfer segment.

If the "tens" order pinions are at "0" at the time of the subtractive tens transfer to the "tens" order caused by the shifting of the noses 100 and 101 to negative total position, the rotation of the "tens" order pinions from "0" to "9" will operate the "tens" order transfer pawl 77 to give rise to a subtractive tens transfer to the "hundreds" order in the usual way. Likewise, if the "tens" order pinions are at "9" at the time of an additive tens transfer to the "tens" order caused by the shifting of the noses 100 and 101 to positive total position, the rotation of the "tens" order pinions from "9" to "0" will operate the "tens" order pawl 77 to cause an additive tens transfer to the "hundreds" order.

By referring again to the general description first given of the mode of operation of the new mechanism, it will be apparent that the results produced by the shifting of the noses 100 and 101 will enable correct totals, whether positive or negative, to be taken from the register by direct total taking operations at any time. The shifting of the noses 100 and 101 occurs at the time the sign of the total in the register changes so that at the end of every operation of the machine, the mechanism is ready to permit the correct total to be taken in a direct total taking operation. When the capacity of the register is exceeded in either direction, the mechanism does not operate to introduce an error.

Further, with the construction described, it is immaterial whether, at the beginning of a new series of operations for accumulating a new total, the register pinions are in the positions in which they would be left by a positive total taking operation, or in the positions in which they would be left by a direct negative total taking operation. In either case, the new total obtained will be correct, whether it is positive or negative.

NEGATIVE TOTAL LOCK

It is usually desirable to give the operator a signal to indicate when the machine is in negative condition. This can be conveniently done by locking a portion of the machine that must be manipulated in the taking of a total. In the present case, a lock is provided for the total key, the lock being controlled by the mechanism that changes the position of the noses 100 and 101.

The lock includes a sliding latch plate 180 similar to that disclosed in Butler patent No. 2,118,588. This plate is mounted between the top and bottom plates of the keyboard and it has notches 181 and 182 formed in it which respectively receive an edge of the stems of the total and sub-total keys T and ST. These notches permit the keys to be depressed when the slide is in the position of Figs. 5 and 6. The slide 180 also has shoulders 184 and 185 cooperating with the subtraction lever 12 and is urged rearward by a spring 183. One arm 193 of a yoke 192 cooperates with the rear end of the slide 180, the other arm 191 of said yoke having a stud 190 which is yieldingly held against the edge of one arm 189 of a yoke 187 by a spring 194 connected at one end to the stud 190 and at its other end to the arm 189. The yoke 187 is rockable on the shaft 188 and the lower end of its other arm 186 has a cam slot cooperating with a stud 125 carried by the yoke 107.

Figs. 5 and 6 show the positions which the parts occupy when the subtraction lever 12 is in its addition position and the yoke 107 is in its positive total position (Fig. 11). The shoulder 184 of the slide 180 is engaged by the subtraction lever 12 which thus holds the slide 180, against the tension of the spring 183, in the position in which the notches 181 and 182 leave the total and sub-total keys T and ST free for depression. If the subtraction lever 12 were moved to subtraction position, the spring 183 would draw the slide 180 rearwardly sufficiently, until its rear end engaged the arm 193, that the notches 181 and 182 would be moved out of alignment the stems of the total and sub-total keys so that these keys would be held against depression. The operator, finding the total and sub-total keys locked, while the subtraction lever is in subtraction position, would be notified that the total in the register was positive and would be compelled to return the subtraction lever to its addition position before depressing the total or sub-total key.

When the yoke 107 rocks from the positive total position of Fig. 11 to the negative total position of Fig. 9, the pin 125 cams the yoke 186, 187, 189 clockwise, pulling the spring 194 upward to urge the yoke 191, 192, 193 counterclockwise. The spring 194 is of greater strength than the spring 183 so that the slide 180 will be moved forwardly, but as when the subtraction lever 12 is in subtraction position, the slide 180 cannot be moved forwardly of the position of Figs. 5 and 6, where notches 181 and 182 leave the total and sub-total keys T and ST free for depression, because of engagement of the shoulder 185 against the subtraction lever 12. But, if the subtraction lever is moved to the addition position, the tensioned spring 194 will rock the yoke 191, 192, 193 further to move the slide 180 forwardly of the Figs. 5 and 6 position to move the notches 181 and 182 out of alignment with the stems of the total and sub-total keys so as to lock these keys against depression. The operator, finding the total and sub-total keys locked against depression when the subtraction lever is in addition position would be notified that the total in the register is negative and would be compelled to move the subtraction lever to subtraction position before being able to depress the total or sub-total keys.

It is to be understood that the structure shown is for the purposes of illustration only and that changes may be made therein without departing from the spirit and scope of the invention as defined by the appended claims.

I claim:

1. A calculating machine having a registering mechanism capable of addition and the accumulation of positive totals and of subtraction and the accumulation of negative totals, said mechanism including a plurality of rotatable register pinions, a tens-transfer mechanism for said registering mechanism including pawls having transfer cam projections operable to arrest said pinions in total taking, total-taking control means for conditioning portions of said machine to enable either a positive or a negative total to be taken directly from said registering mechanism, and means controlled automatically in accordance with the sign of the total in said registering mechanism for automatically changing the position of the cam projection of the tens-transfer pawl in the "units" order while said units register pinion is held against movement whereby mathematically required tens-transfers will be caused between the "units" and "tens" order, and whereby the total withdrawn from said registering mechanism will be the exact algebraic sum of the actual entries into said registering mechanism, both when the total is positive and when it is negative.

2. A calculating machine having a registering mechanism capable of addition and the accumulation of positive totals and of subtraction and the accumulation of negative totals, said registering mechanism comprising a plurality of rotatable register pinions, total-taking control means for conditioning portions of said machine to enable a positive or a negative total to be taken directly from said registering mechanism, a tens-transfer mechanism, including transfer pawls, controlled by the respective pinions for causing tens-transfers to the pinions of next higher order, the rotation of the register pinions in total taking being limited by said transfer pawls, and means controlled in response to the sign of the total in the registering mechanism for controlling the "units" order transfer pawl to enable the withdrawal from said register of the exact algebraic sum of the entries into said register while at the same time having the tens-transfer mechanism operative to perform all mathematically required tens-transfers.

3. A calculating machine having a registering mechanism capable of addition and the accumulation of positive totals and of subtraction and the accumulation of negative totals, and comprising a plurality of register pinions having index elements, transfer mechanism including control elements engageable with said index elements in orders higher than the lowest order to cause transfers and to arrest said higher order pinions in direct negative total taking in negative "0" positions which differ from the positive "0" positions in which they are arrested by engagement of said index elements and control elements in positive total taking, said transfer mechanism also including adjustable control means to engage the index element of the lowest order pinion to cause transfers to the next higher order and to arrest said lowest order pinion in total taking, and means governed by said registering mechanism acting automatically when the algebraic sign of the total in the register changes to adjust said adjustable control means to position for arresting the lowest order pinion in its positive "0" position in taking a total of the sign of that contained in the register, and causing such transfers to pinions of higher orders as may be required to bring them to positions which, in relation to the "0" positions of the sign corresponding to the sign of the total in the register, correspond to the correct algebraic total.

4. A calculating machine having a register mechanism including a plurality of rotatable pinions having index elements and capable of addition and subtraction and of accumulating positive totals and negative totals, means for rotating said pinions and index elements in one direction in addition and in negative total taking and in the opposite direction in subtraction and in positive total taking, total-taking control means, transfer mechanism including control elements engageable, upon passage of the control element of a register pinion of any order except the highest order through a transfer point by said index element to cause a transfer to the next higher order whereby, after an odd number of changes of algebraic sign in the register, the total indicated by the extents to which the index elements and pinions have been moved contains an error, said control elements arresting the index elements and pinions in orders higher than the lowest order in positive total taking in "positive 0" positions and in negative total taking in "negative 0" positions differing from said "positive 0" positions so that when said higher order index elements and pinions are arrested in total taking after an odd number of changes of algebraic sign in the register in the "0" positions other than those from which they started in accumulating the total, the total drawn from the register contains an error having the algebraic sign opposite to the algebraic sign of the first-mentioned error, the control element for the lowest order being adjustable to determine the position in which the lowest order index element and pinion will be arrested in total taking and to cause mathematically required transfers to the next higher order, and means controlled automatically in accordance with the adding or subtracting condition of the register and from the index element of the pinion of highest order for adjusting the control element for the lowest order to cause the absolute values of said errors to become equal, whereby the total drawn from the register will be correct.

5. A calculating machine having a registering mechanism capable of addition and the accumulation of positive totals and of subtraction and the accumulation of negative totals, said mechanism including a plurality of rotatable registering members each having an index element, total-taking control means for conditioning portions of said machine to enable either a positive or a negative total to be taken directly from said registering mechanism, stop means to engage said index elements for limiting the rotation of said registering members in total-taking operations, the stop means for the lowest order registering member being adjustable, and means to adjust said lowest order stop means into positive or negative zero position to cause said registering members to be arrested in total taking in such positions that the total withdrawn from said registering mechanism will be the exact algebraic sum of the actual entries into said registering mechanism both when said total is positive and when it is negative.

6. A calculating machine having a registering mechanism capable of addition and the accumulation of positive totals and of subtraction and the accumulation of negative totals, said mechanism including a plurality of rotatable registering members each having an index element, total-taking control means for conditioning portions of said machine to enable either a positive or a negative total to be taken directly from said registering mechanism, stop means to engage said index elements for limiting the rotation of said registering members in total-taking operations, the stop means for the lowest order registering member being adjustable, and means controlled automatically by said registering mechanism in accordance with the sign of the total in said registering mechanism to adjust said lowest order stop means into positive or negative zero position to cause said registering members to be arrested in total taking so that the total taken will be the exact algebraic sum of the actual entries into said registering mechanism, both when said total is positive and when it is negative.

CARL W. CROUSE.